United States Patent
Anderson et al.

(10) Patent No.: US 10,963,574 B2
(45) Date of Patent: *Mar. 30, 2021

(54) VIDEO SECURITY AND RAY TRACING SAMPLES COMPRESSION SYSTEM

(71) Applicant: GO GHOST, LLC, San Diego, CA (US)

(72) Inventors: Erik Anderson, San Diego, CA (US); Mathew Fride, San Diego, CA (US)

(73) Assignee: GO GHOST, LLC, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,582

(22) Filed: Sep. 6, 2019

(65) Prior Publication Data

US 2020/0074089 A1 Mar. 5, 2020

Related U.S. Application Data

(60) Continuation of application No. 16/117,841, filed on Aug. 30, 2018, now Pat. No. 10,410,001, which is a
(Continued)

(51) Int. Cl.
*G06T 15/06* (2011.01)
*G06T 15/50* (2011.01)
(Continued)

(52) U.S. Cl.
CPC ............ *G06F 21/602* (2013.01); *G06F 21/10* (2013.01); *G06T 15/005* (2013.01); *G06T 15/06* (2013.01);
(Continued)

(58) Field of Classification Search
CPC ................................. G06T 15/50; G06T 15/06
See application file for complete search history.

(56) References Cited

U.S. PATENT DOCUMENTS 6,437,830 B1 8/2002 Horlander
7,477,777 B2 1/2009 Wells
(Continued)

OTHER PUBLICATIONS

International Preliminary Report on Patentability received in PCT/US18/48949, dated Mar. 12, 2020, 11 pages.
(Continued)

*Primary Examiner* — Matthew Salvucci
(74) *Attorney, Agent, or Firm* — ARC IP Law, PC; Joseph J. Mayo

(57) ABSTRACT

Secure rendering system that creates ray tracing samples with obfuscated positions, so that images can only be viewed by an authorized consumer able to recover the sample positions. Obfuscation of ray directions is integrated into the rendering process, for example by incorporating encryption into a lens shader. The rendering system never stores or transmits an image without obfuscating positions, so even the rendering system cannot see the image it is rendering. Embodiments may use public key cryptography, so that encryption of sample positions is done with a public key, and only the owner of the secret private key can view the rendered image. Since keys are asymmetric, the rendering system cannot decrypt the obfuscated samples. Piracy of rendered images is therefore mitigated. Some compositing operations may be performed on the secure rendering output prior to decrypting sample positions; for example, colors may be modified globally or for selected objects.

25 Claims, 32 Drawing Sheets
(20 of 32 Drawing Sheet(s) Filed in Color)

Related U.S. Application Data division of application No. 15/995,312, filed on Jun. 1, 2018, now Pat. No. 10,127,392, which is a continuation-in-part of application No. 15/691,686, filed on Aug. 30, 2017, now Pat. No. 9,990,761.

(51) Int. Cl.
| | | |
|---|---|---|
| *G06F 21/60* | (2013.01) | |
| *G06T 19/20* | (2011.01) | |
| *H04L 9/30* | (2006.01) | |
| *G06T 15/00* | (2011.01) | |
| *G06F 21/10* | (2013.01) | |
| *G09C 5/00* | (2006.01) | |

(52) U.S. Cl.
CPC ............... *G06T 19/20* (2013.01); *G09C 5/00* (2013.01); *H04L 9/30* (2013.01); *G06T 15/50* (2013.01); *G06T 2210/08* (2013.01); *G06T 2219/2012* (2013.01); *H04L 2209/16* (2013.01)

(56) References Cited

U.S. PATENT DOCUMENTS

| | | |
|---|---|---|
| 9,424,677 B2 | 8/2016 | Anderson |
| 2002/0093538 A1 | 7/2002 | Carlin |
| 2004/0095343 A1 | 5/2004 | Forest et al. |
| 2009/0147002 A1 | 6/2009 | Keller |
| 2013/0027417 A1 | 1/2013 | Merrell et al. |
| 2014/0333623 A1 | 11/2014 | Ozdas et al. |
| 2015/0262409 A1 | 9/2015 | Morgan et al. |

OTHER PUBLICATIONS

International Search Report and Written Opinion received in PCT/US18/48949, dated Nov. 26, 2018, 12 pages.

Bala, et al., Interactive Ray-Traced Scene Editing Using Ray Segment Trees, The Tenth Eurographics Workshop on Rendering, Spain, Jun. 1999.

Radziszewski, et al., Interactive Ray Tracing Client, WSCG 2010 Communication Papers, 2010.

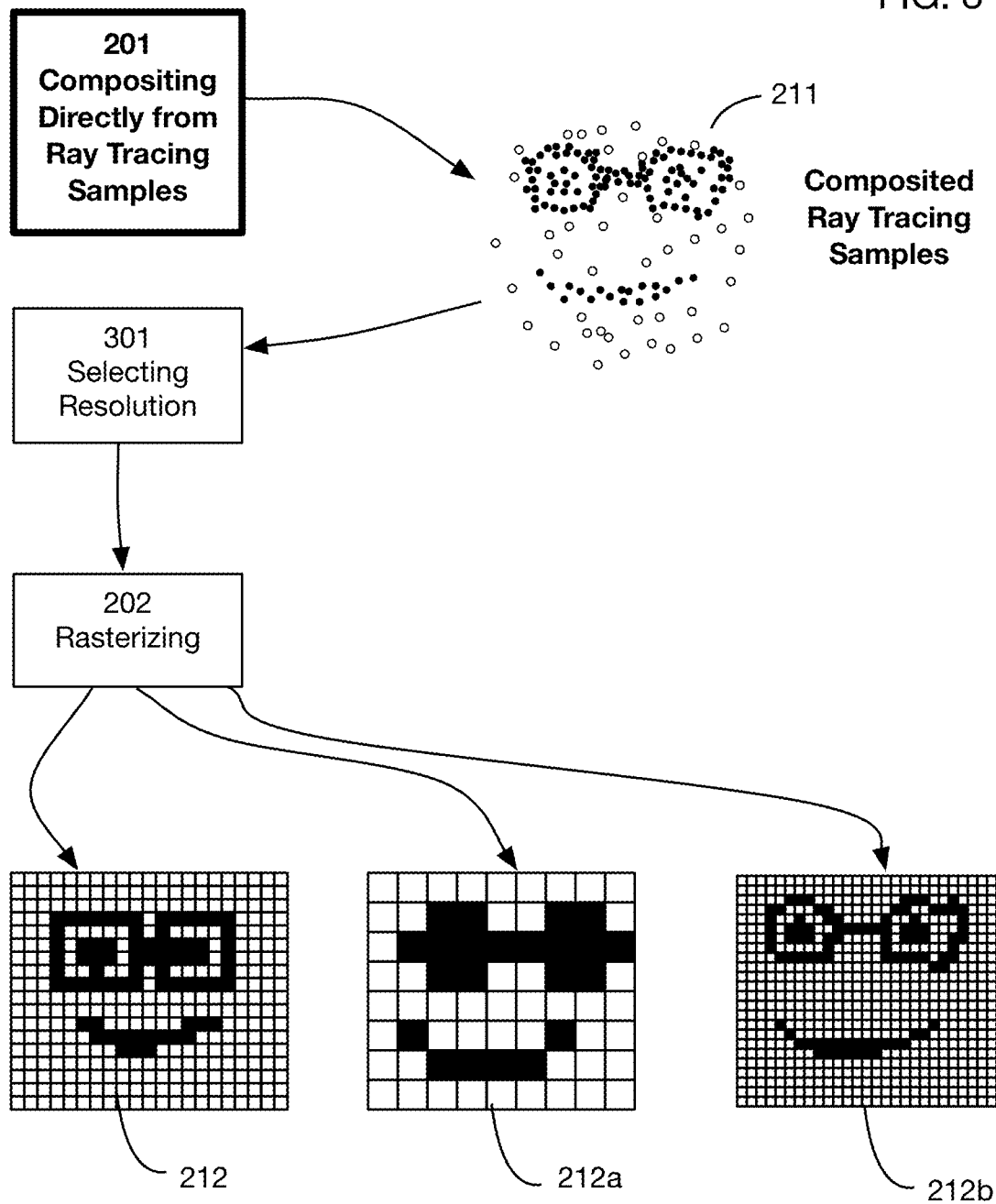

PRIOR ART
FIG. 6
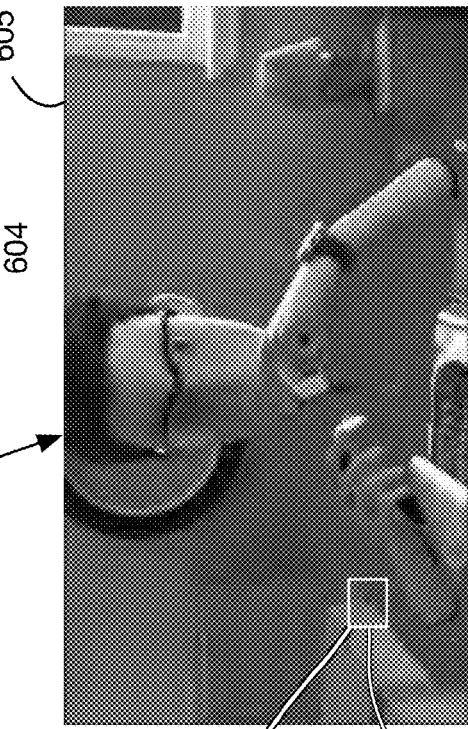
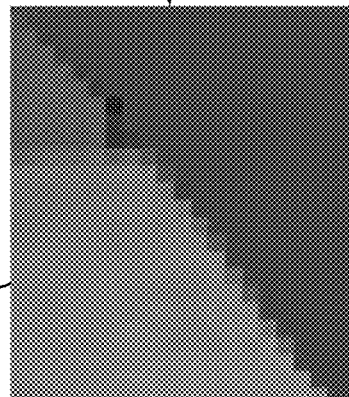

FIG. 10A
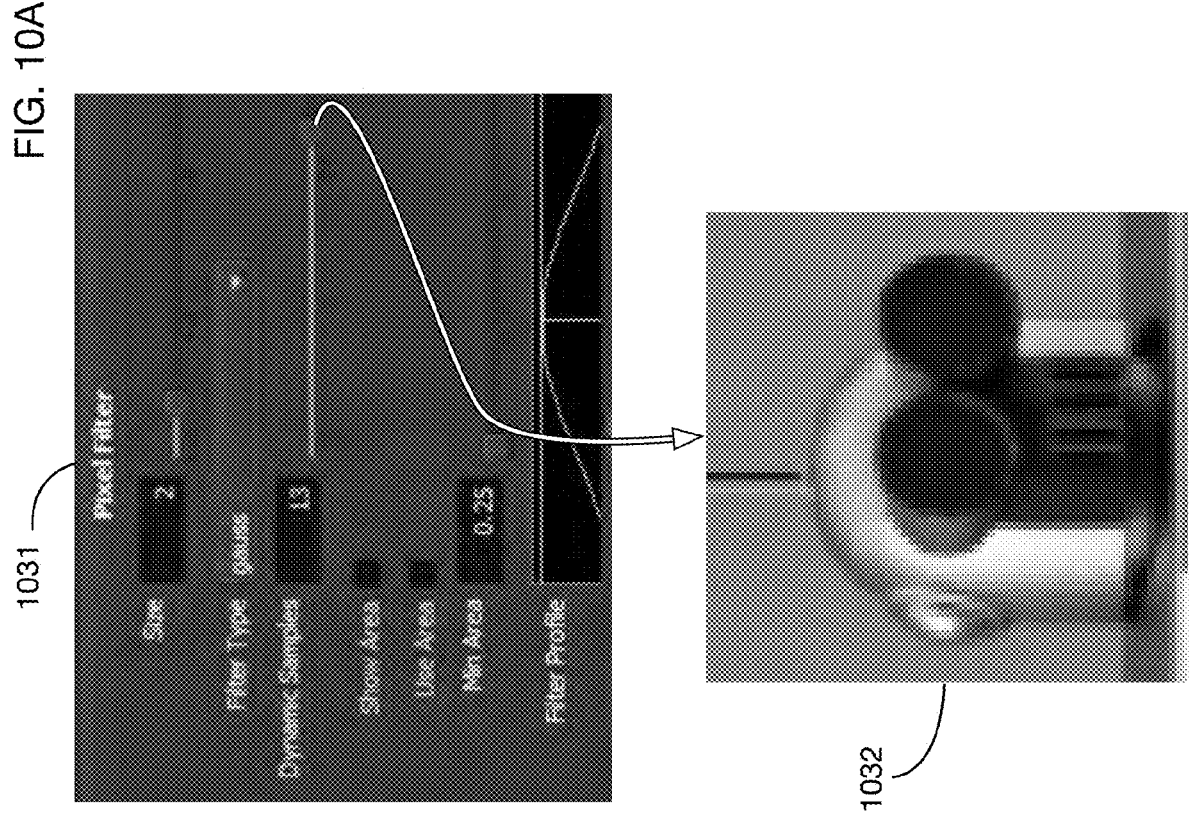
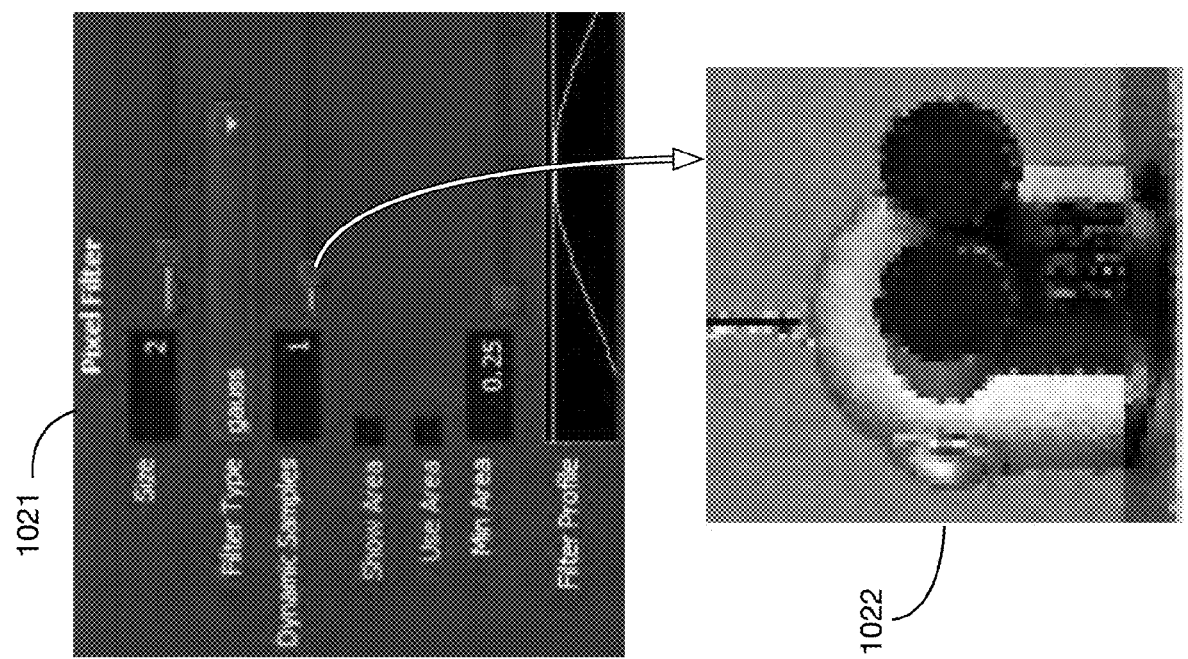

FIG. 12A
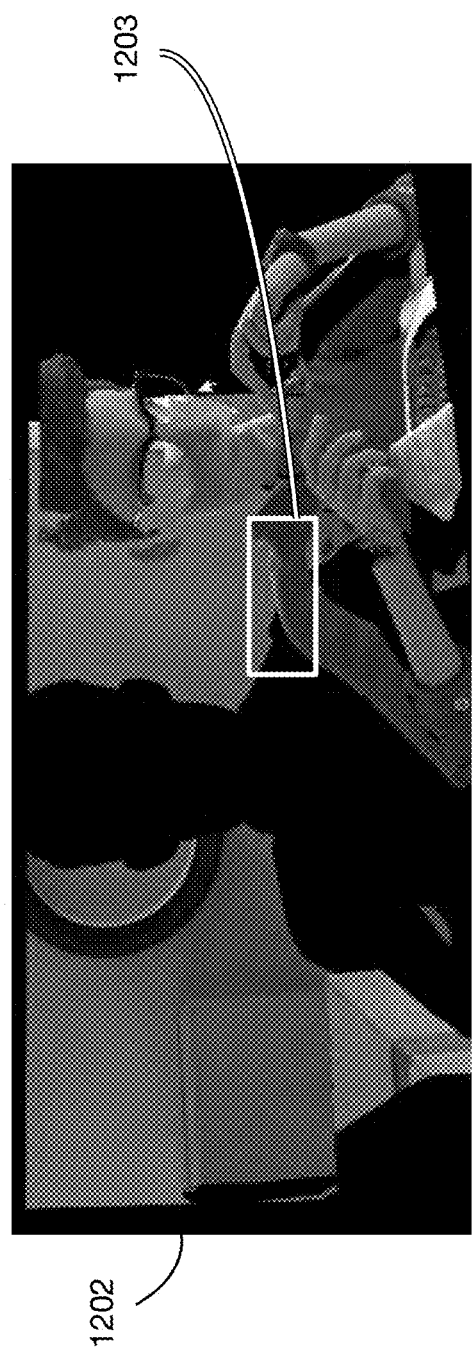

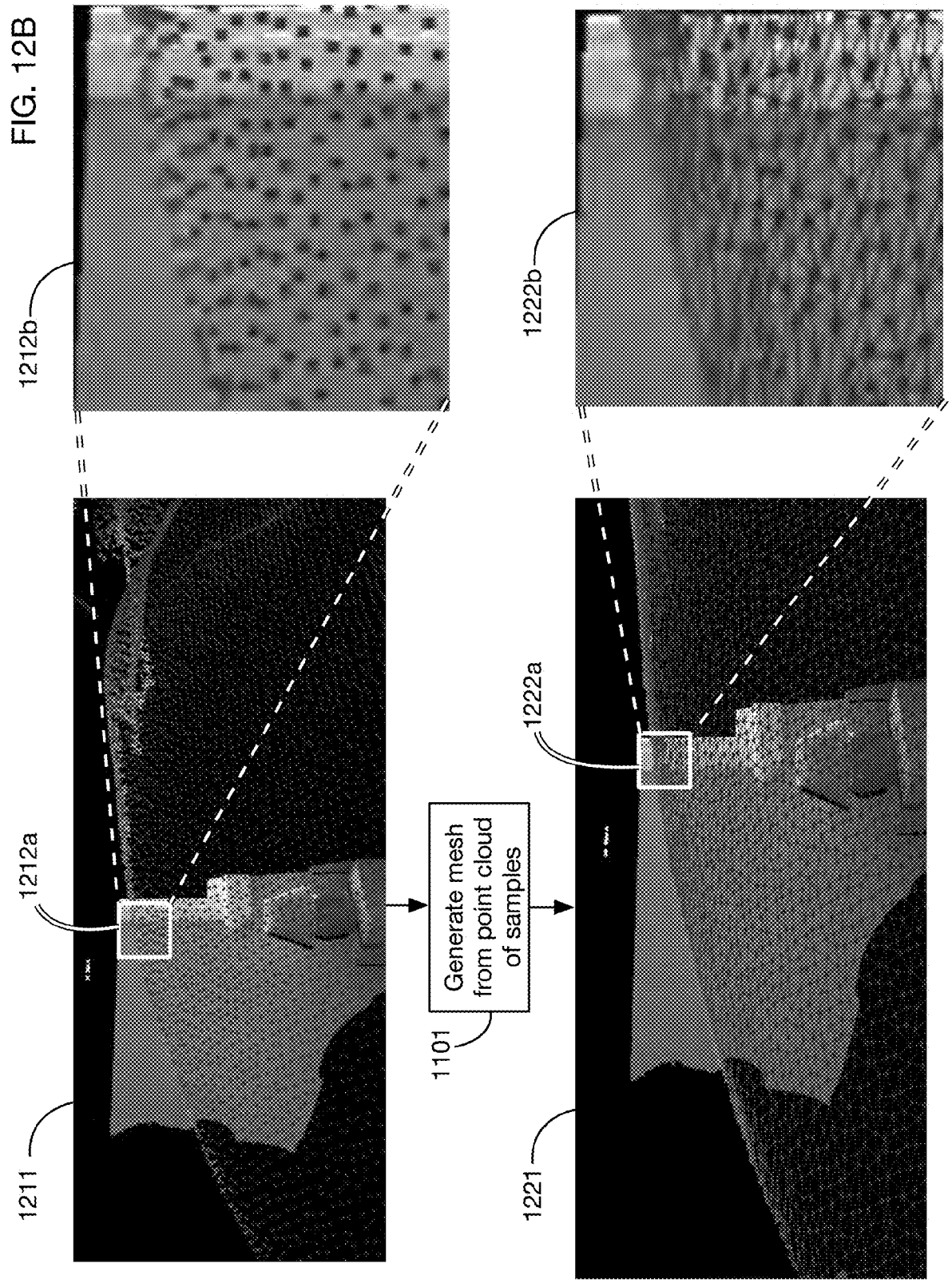

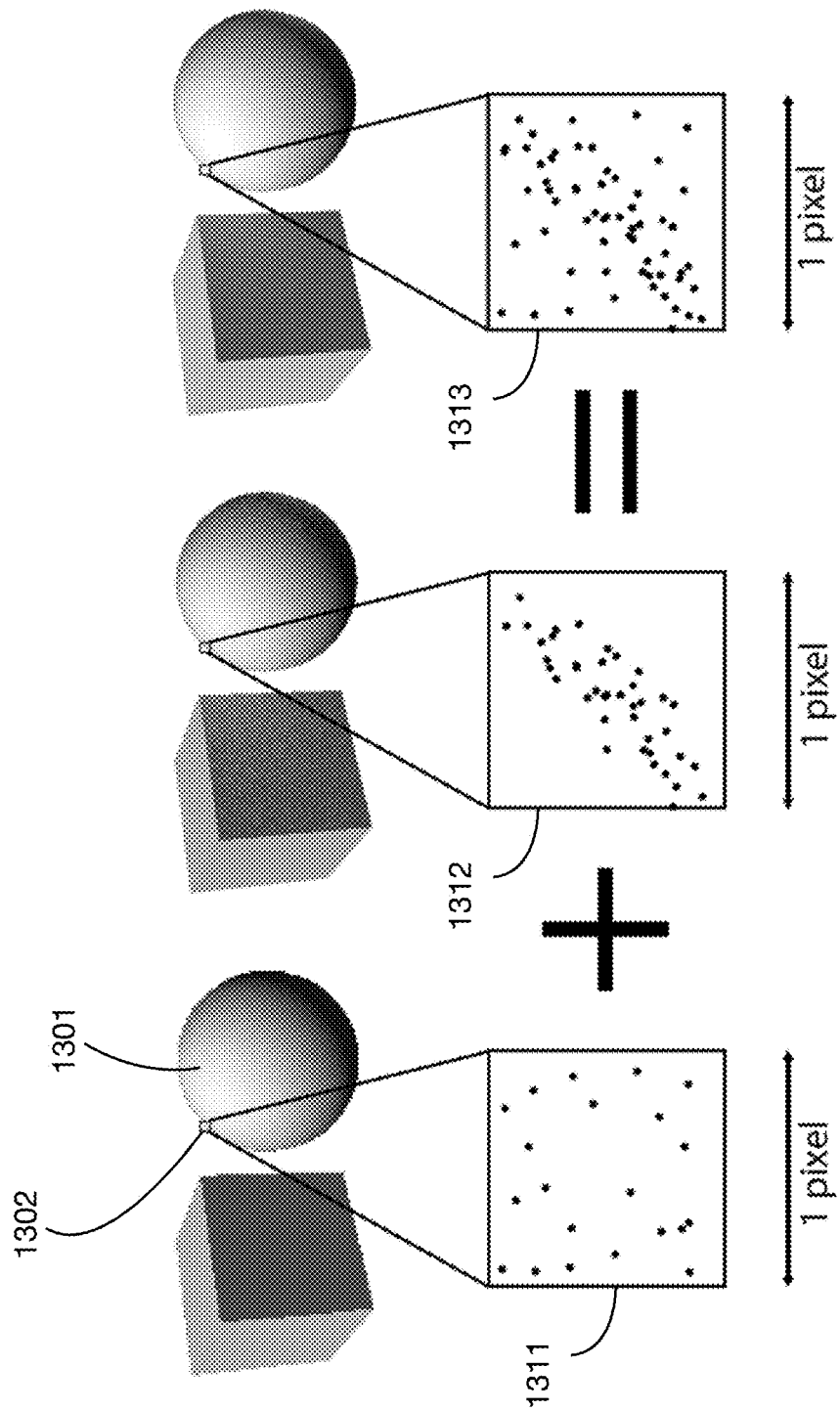

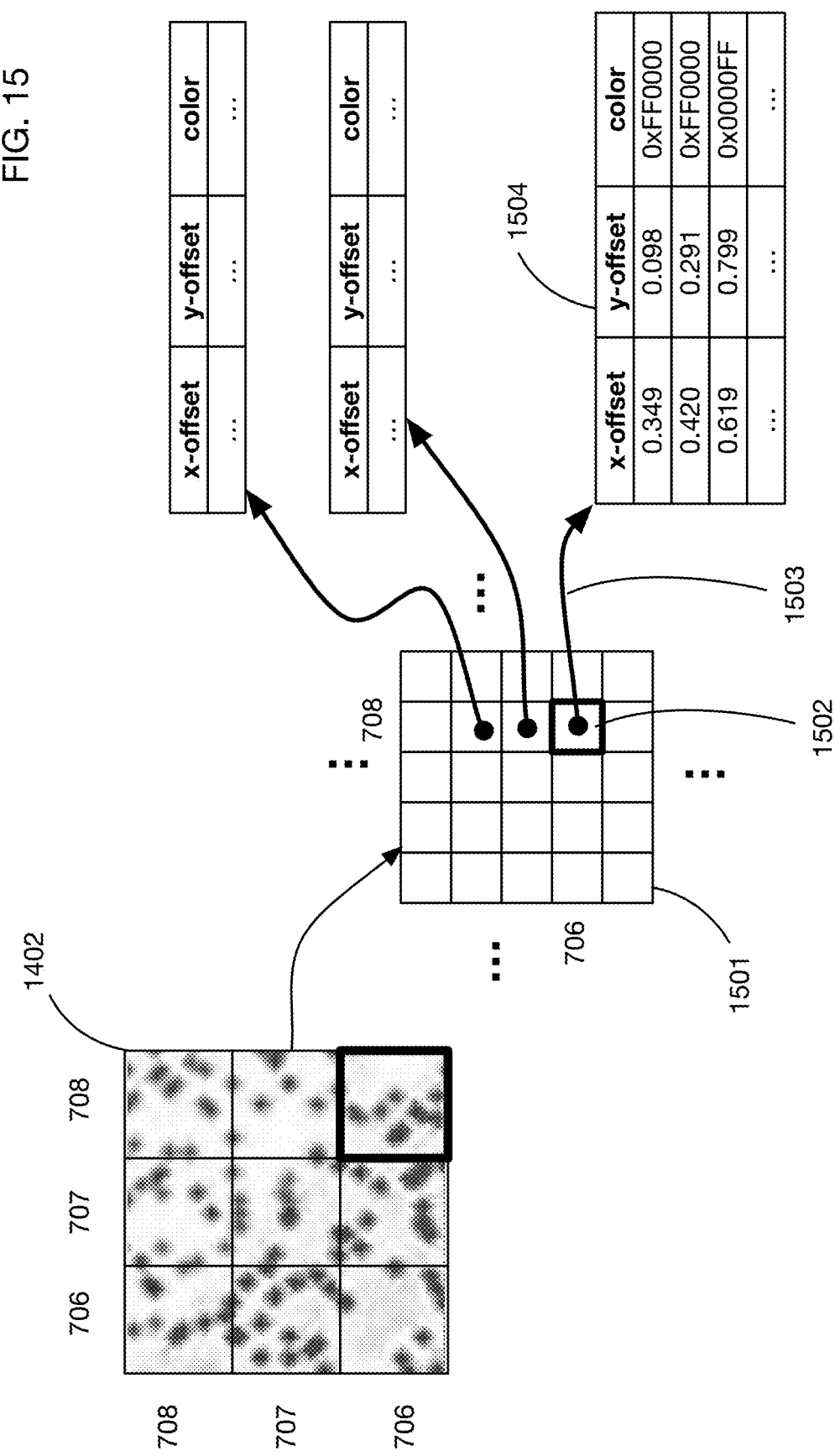

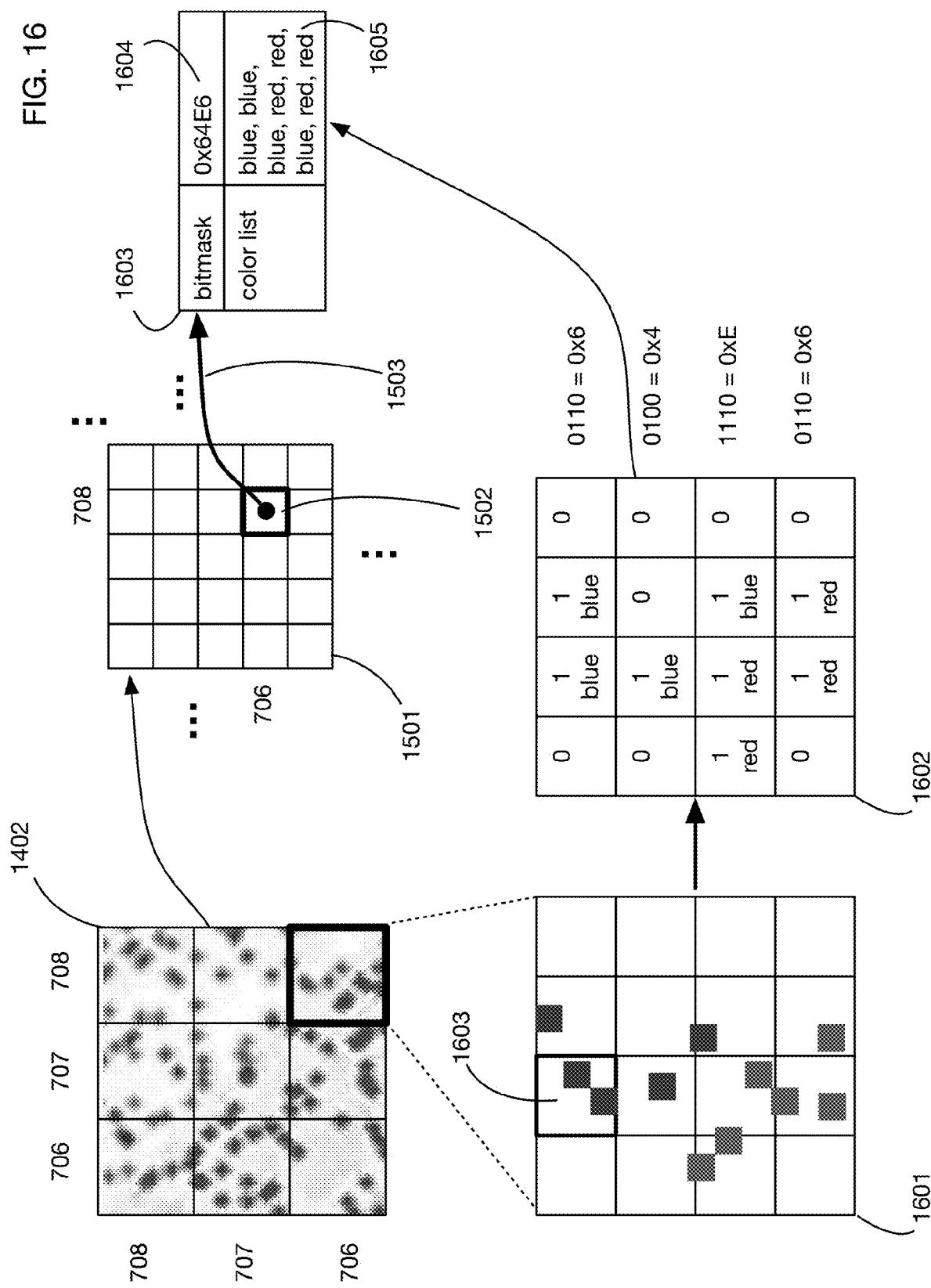

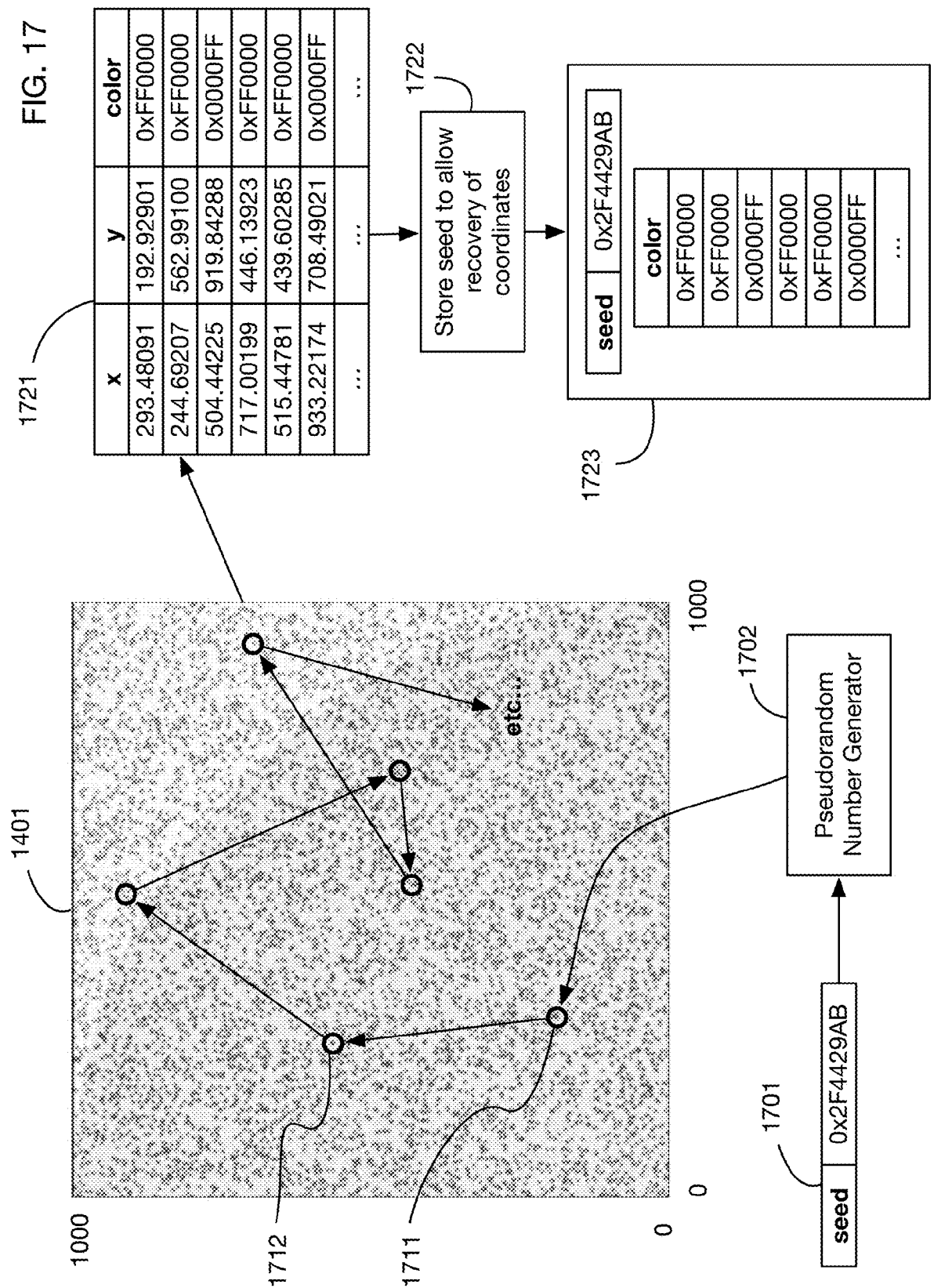

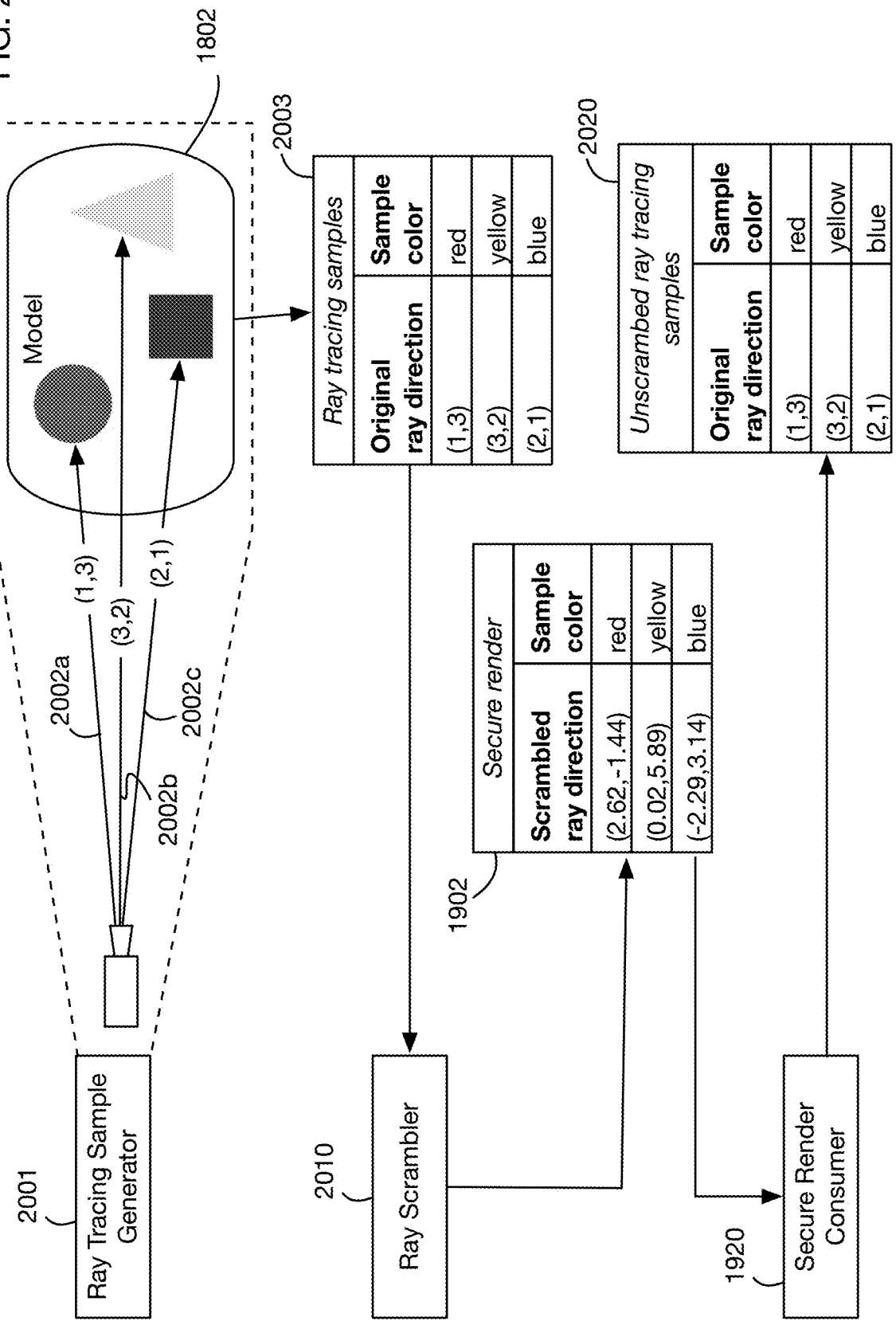

FIG. 21A Prior Art

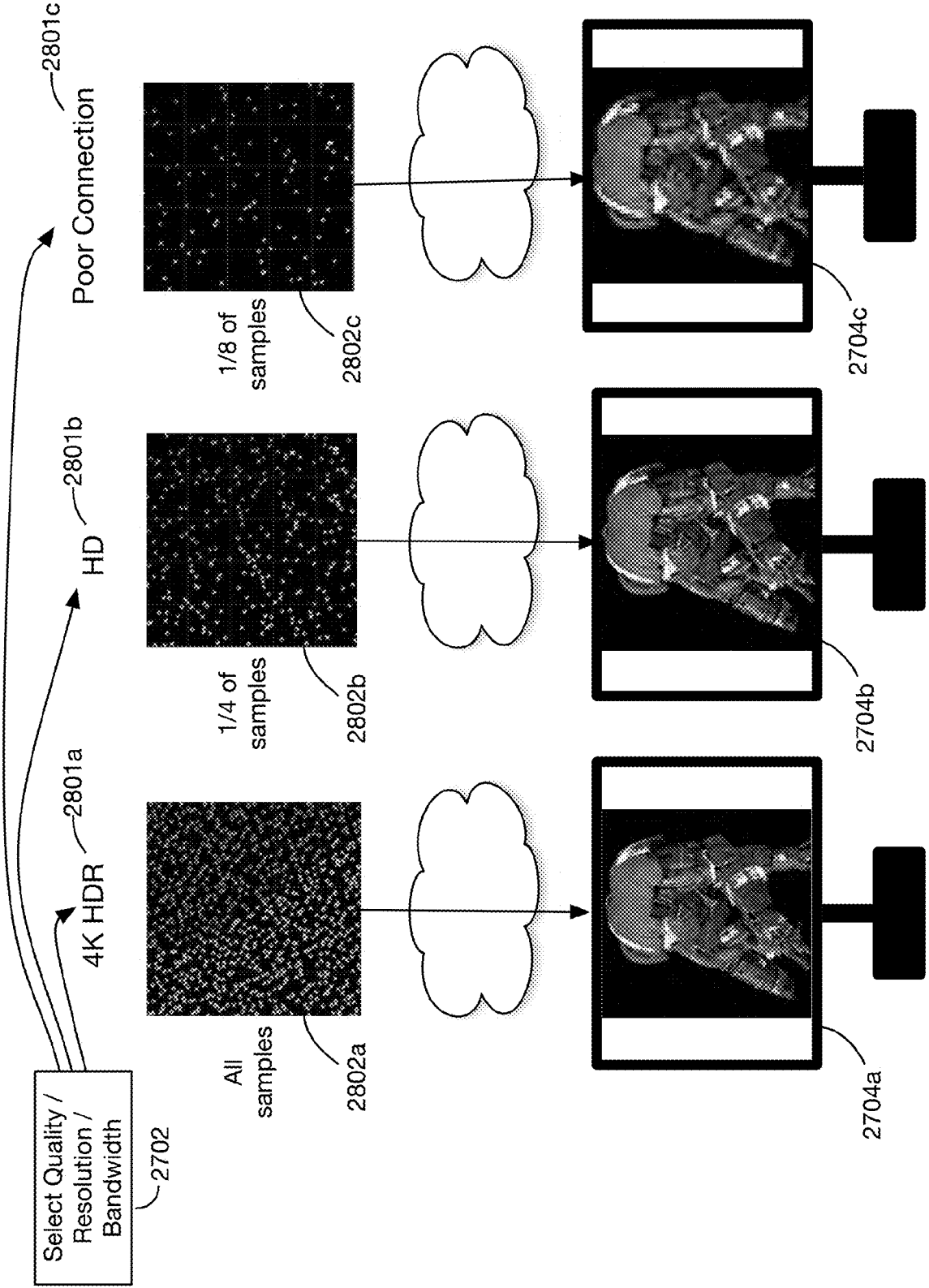

VIDEO SECURITY AND RAY TRACING SAMPLES COMPRESSION SYSTEM

This application is a continuation of U.S. Utility patent application Ser. No. 16/117,841, filed 30 Aug. 2018, which is a divisional of U.S. Utility patent application Ser. No. 15/995,312, filed 1 Jun. 2018, which is a continuation-in-part of U.S. Utility patent application Ser. No. 15/691,686, issued as U.S. Pat. No. 9,990,761, filed 30 Aug. 2017, the specifications of which are hereby incorporated herein by reference.

BACKGROUND OF THE INVENTION

Field of the Invention

One or more embodiments of the invention are related to the fields of computer graphics and image enhancement. More particularly, but not by way of limitation, one or more embodiments of the invention enable a secure rendering system that generates ray tracing samples with obfuscated position data.

Description of the Related Art

Image production pipelines, such as those employed in visual effects or computer graphics projects, often include compositing operations that manipulate images or frames. Illustrative compositing operations may for example modify the colors, appearance, visibility, or locations of elements within an image, or they may combine elements from different sources into a single image or frame sequence. Often a rendering stage precedes compositing; rendering may for example transform a three-dimensional model of a scene into one or more images that may then be manipulated via compositing operations. Rendering often uses ray tracing techniques, which simulate the path of light rays between the eye of the viewer of an image and the objects in a scene. The ray tracing renderer generates a large number of simulated light rays, and generates a ray tracing sample for the intersection of each ray with the objects in the scene. A ray tracing sample may for example include data on the identity of the object that the light ray hits, the location of the intersection, and the color at the point of intersection.

In traditional image production pipelines known in the art, rendering via ray tracing is followed by rasterization, which transforms the ray tracing samples from the renderer into a grid of pixels. The rasterized image (represented as pixels) then provides the input to the compositing stage of the pipeline. Compositing operations known in the art therefore manipulate the pixels of images that have already been rasterized.

A drawback of this existing process is that a large amount of information generated by the renderer is discarded when the renderer's output is rasterized into pixels. Compositing operations are therefore less effective and less flexible than they could be if they directly manipulated the renderer's ray tracing output. Historically, rasterization prior to compositing has been used because storage capacity and processing power were insufficient to support compositing directly from ray tracing samples. However, with current storage capacity and with the processing power available in graphics processing units (GPUs) and multicore CPUs, compositing directly from ray tracing samples becomes feasible. Compositing directly from ray tracing samples provides several benefits compared to compositing from rasterized images, since the ray tracing samples contain more information and are typically at a finer granularity.

Another challenge with existing rendering systems is establishing and enforcing security so that rendered images and videos cannot be pirated or stolen. For example, movie studios or other content producers often face the risk that the content they are rendering is pirated. Pirating may be done by employees, contractors, or service providers. In particular, the possibility of pirating of rendered images and videos may dissuade studios and producers from outsourcing rendering to service providers, since they expect that by keeping rendering in-house they can mitigate the pirating risks more effectively. This reluctance to outsource may lead to inefficiencies since studios and producers must all reproduce the large infrastructure (with hundreds or thousands of servers, for example) necessary to render complex scenes with modern graphics and effects. Existing rendering systems cannot provide assurances that rendered images and videos will not be pirated. Encrypting rendered images post-rendering may not be sufficient, for example, since the rendering system may still generate or store the unencrypted rendered images prior to the encryption step, making them subject to piracy. There is a need for a system that provides an inherently secure rendering solution, wherein the output of the secure rendering system cannot be used by pirates because rendered images are obfuscated as an integral part of the secure rendering process.

For at least the limitations described above there is a need for a secure rendering system that generates ray tracing samples with obfuscated position data.

BRIEF SUMMARY OF THE INVENTION

One or more embodiments described in the specification are related to a secure rendering system that generates ray tracing samples with obfuscated position data. The secure rendering system may for example determine the color of a ray tracing sample by projecting a ray into a model of a scene, but may obfuscate the ray's direction or position prior or during the gathering or storing the sample color. Since in one or more embodiments of the invention the ray casting direction is scrambled before the sample color is gathered, these embodiments of the invention mitigate the potential for an attack vector. For example, since one or more embodiments of the invention scramble the direction that the sample is sent or casted out, when the sample finally hits an object and gathers the object's color, the direction has already been obfuscated before even gathering the color data. This prevents ordered samples and colors from coexisting and eliminates a middle man attack on the scrambler itself. In effect, by scrambling before the color has been gathered, one or more embodiments of the invention eliminate the coincidence of ordered samples and colors. Embodiments of the invention also enable streaming of obfuscated ray casting directions and/or colors to prevent pirating in a novel manner. An authorized consumer of the secure render may recover the original ray direction or position in order to view the rendered image.

One or more embodiments of the invention are related to a method of image compositing directly from ray tracing samples. Embodiments of the invention enable compositing operations that directly access and modify data from a ray tracing renderer, prior to rasterizing an image into pixels. This approach contrasts with the typical workflow in the prior art, which rasterizes an image after rendering, and performs compositing operations on the rasterized image. In one or more embodiments, image compositing directly from ray tracing samples may be provided in conjunction with a secure rendering system as described above, for example.

One or more embodiments of the invention may obtain ray tracing samples from a ray tracing renderer that renders a scene, and apply one or more compositing operations to these ray tracing samples. Each ray tracing sample may contain information associated with the intersection of a simulated light ray generated by the renderer with an object in the scene. This information may include for example, without limitation, the location of the point of intersection that generates the sample, the identity of the object intersected, and the color at that point. Location information may be for example two-dimensional or three-dimensional. In one or more embodiments, sample information may include any other data values generated by the renderer or otherwise generated or obtained.

After applying compositing operations directly to the ray tracing samples, the modified samples may be rasterized into a pixel image. Rasterizing may for example set the color of each pixel to a blend of the colors of the modified ray tracing samples within a pixel or near a pixel.

Ray tracing renderers may generate directions for simulated light rays in any desired patterns. These patterns may generate multiple samples per pixel. The number of samples per pixel may vary; for example, a renderer may generate more samples per pixel near object edges. One or more embodiments may obtain and manipulate ray tracing samples that are in an irregular, random, or pseudo-random pattern, rather than in a regular grid pattern; these irregular, randomized ray patterns are often used by ray tracing renderers to avoid rendering artifacts such as Moiré patterns. Thus, the rays projected on a plane in general are not equidistant from one another.

One or more embodiments may perform any type or types of compositing operations directly on the ray tracing samples. For example, without limitation, compositing operations may include selection of one or more objects, which may select the ray tracing samples associated with these objects. Object selection therefore operates directly and immediately to select a corresponding set of samples, without the need for an object mask. Selected samples may be for example moved, rearranged, shown or hidden, or modified in color or texture. In one or more embodiments, compositing operations may include merging of ray tracing samples obtained from rendering of different scenes or different parts of a scene.

One or more embodiments may support compositing operations that reposition or rearrange objects in three-dimensional space. Sample locations may for example identify a three-dimensional point where a simulated ray intersects an object in a scene. Ray tracing samples may be manipulated as point clouds in three-dimensional space. Compositing operations may also include generating a modified image that represents the scene from a different viewpoint, which may be used for example to generate stereo images. Instead of rerendering an entire scene from a different viewpoint, one or more embodiments may reposition samples via compositing operations to reflect the modified viewpoint, and then request only those samples from the renderer that are needed to fill in missing background samples exposed by the new viewpoint. When repositioning objects in three-dimensional space via compositing operations on ray tracing samples, objects or parts of objects may become occluded by other objects even if they were not occluded in the original image. Compositing directly from ray tracing samples supports correctly rasterizing images to take into account these occlusion effects: for example, a sample may be ignored in rasterization if it is surrounded by or near other samples that are closer to the viewer.

After application of compositing operations to the ray tracing samples, the modified samples may be rasterized into one or more pixel images at any desired resolution, or at multiple resolutions. Resolution may be selected for example based on the resolution of a display on which the image will be shown, or based on a desired output resolution for storage, or for transmission over a network, i.e., based on the available bandwidth of the network.

During or after compositing, it may be desirable to generate preview images of the effects of the compositing operations. One or more embodiments may generate preview images using only a subset of the ray tracing samples, for example in order to generate these preview images more quickly or more efficiently. In one or more embodiments, a quality level for a preview image may be specified, which may for example affect how many samples per pixel are used to generate the preview image. A higher quality or full quality image may be generated in the background while a lower quality preview image is displayed, and may replace the lower quality preview image when it is ready, or over time to dynamically update the image. Generation of preview images or final images may be performed completely or in part using a graphics processing unit.

One or more embodiments may generate a mesh (or a set of meshes) from the composited ray tracing samples, instead of or in addition to generation of pixel images.

Compositing operations may access or manipulate any data values associated with ray tracing samples, including but not limited to color, location, and object identity.

One or more embodiments may enable a secure rendering system, which may for example prevent or mitigate piracy of rendering images. For example, one or more embodiments of a secure rendering system may integrate a ray scrambler into the rendering pipeline to obfuscate sample positions. A ray tracing sample generator may first generate ray tracing samples using an original ray direction; a sample color may be assigned based for example on an intersection of the ray with an object or objects in a three-dimensional model of a scene to be rendered. In one or more embodiments, prior to gathering colors, or prior to saving or storing rendered output, these ray tracing samples may be transmitted to a ray scrambler that transforms the original ray direction into a scrambled ray direction. Samples with the scrambled ray directions may be output as a secure render. The secure render may be transmitted to a secure render consumer that can unscramble the scrambled ray directions to recover the original unscrambled ray tracing samples and generate a rasterized image suitable for display on the respective device.

In one or more embodiments, ray scrambling may be performed at any stage of the rendering pipeline. For example, scrambling of ray directions may occur prior to obtaining a sample color, or after obtaining a sample color. Scrambling before obtaining a sample color eliminates a middle man attack on the scrambler, thus eliminating one attack vector. Ray scrambling may be embedded in a ray tracer or a lens shader, or in any other subsystem of a rendering pipeline. Rays may be scrambled in one or more embodiments as they are cast by a raycasting rendering operation. Scrambling and other rendering operations may be performed in any desired order.

In one or more embodiments any or all components of a secure rendering system may execute on or be incorporated into one or more processors, including for example one or more graphics processing units. In one or more embodiments all or portions of the ray scrambler may be incorporated into or integrated into a lens shader of a rendering pipeline.

In one or more embodiments the ray scrambler may scramble the original ray direction by encrypting it using a cryptographic algorithm and an encryption key, and the secure render consumer may recover the unscrambled ray direction by decrypting the secure render with a matching cryptographic algorithm and decryption key. Either public key cryptography (for example, with asymmetric public decryption key and private decryption key) or private key cryptography (for example, with symmetric encryption and decryption keys) may be used. One or more embodiments using public key cryptography may use multiple private keys corresponding to the public key; the private keys may be used individually or in combination to decrypt the secure render. One or more embodiments may scramble the original ray direction by removing the ray directions altogether from the secure render, and by sharing a pseudorandom number generator and seed between the ray tracing sample generator and the secure render consumer so that the secure render consumer can reproduce the original ray directions.

One or more embodiments may incorporate a secure render compositor that may manipulate certain data in the secure render prior to transmitting it to the secure render consumer. For example, the secure render compositor may modify one or more sample colors, which in some cases may be possible without recovering the original ray directions. In one or more embodiments, secure ray tracing samples may include object identifiers; a secure render compositor may for example select samples from a secure render that match one more target object identities, and may then modify the colors of certain samples within these selected samples.

One or more embodiments may incorporate one or more additional security transformations on a secure render beyond obfuscating ray directions. For example, the ray scrambler or another component may encrypt sample colors, or may encrypt the entire secure render. One or more embodiments may use separate keys or techniques for scrambling of ray directions and encryption of colors, for example.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 3 shows another variation of the pipeline of FIG. 2A, which also illustrates one of the potential benefits of compositing directly from ray tracing samples: pixel resolution may be selected after compositing, and images at different resolution may be generated to match display capabilities or other objectives.

FIG. 6 shows an illustrative compositing operation using techniques known in the art: a specific object (a shirt) is selected via a mask, and the color of pixels within the mask is modified; this technique may result in unnatural edge effects since the detail of the ray tracing samples has been discarded by rasterizing prior to compositing.

FIG. 10A illustrates another example of modifying image quality by varying the number of ray tracing samples used per pixel.

FIGS. 12A and 12B show another example of generation of a mesh, for an object selected from the scene shown in FIG. 4.

FIG. 13 illustrates merging ray tracing samples obtained from different passes of a renderer to form a composited image.

FIG. 15 illustrates a sample storage optimization that may be utilized in one or more embodiments, which stores coordinate offsets within each pixel, and which may truncate floating point precision.

FIG. 16 illustrates another sample storage optimization that may be used in one or more embodiments, which divides a pixel or a tile into subregions, and which uses a bitmask to indicate the presence or absence of a sample in each subregion.

FIG. 17 illustrates another sample storage optimization that may be used in one or more embodiments, which stores only the colors (and potentially other information such as object identity) associated with each sample, and stores the random seed used to generate the sample locations in order to reproduce those locations when needed.

FIG. 20 shows illustrative components of an embodiment of a secure rendering system, including a ray tracing sample generator that generates rays and ray tracing samples, a ray scrambler that obfuscates sample positions, and a secure render consumer that can recover the correct positions.

FIG. 21A shows a prior art rendering system that generates rays and crates samples that can be used directly to view an image.

FIG. 28 illustrates use of a sample streaming solution to dynamically select the number of samples to stream to accommodate different requirements and capabilities for display resolution and streaming connection quality.

DETAILED DESCRIPTION OF THE INVENTION

A secure rendering system that generates ray tracing samples with obfuscated position data will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
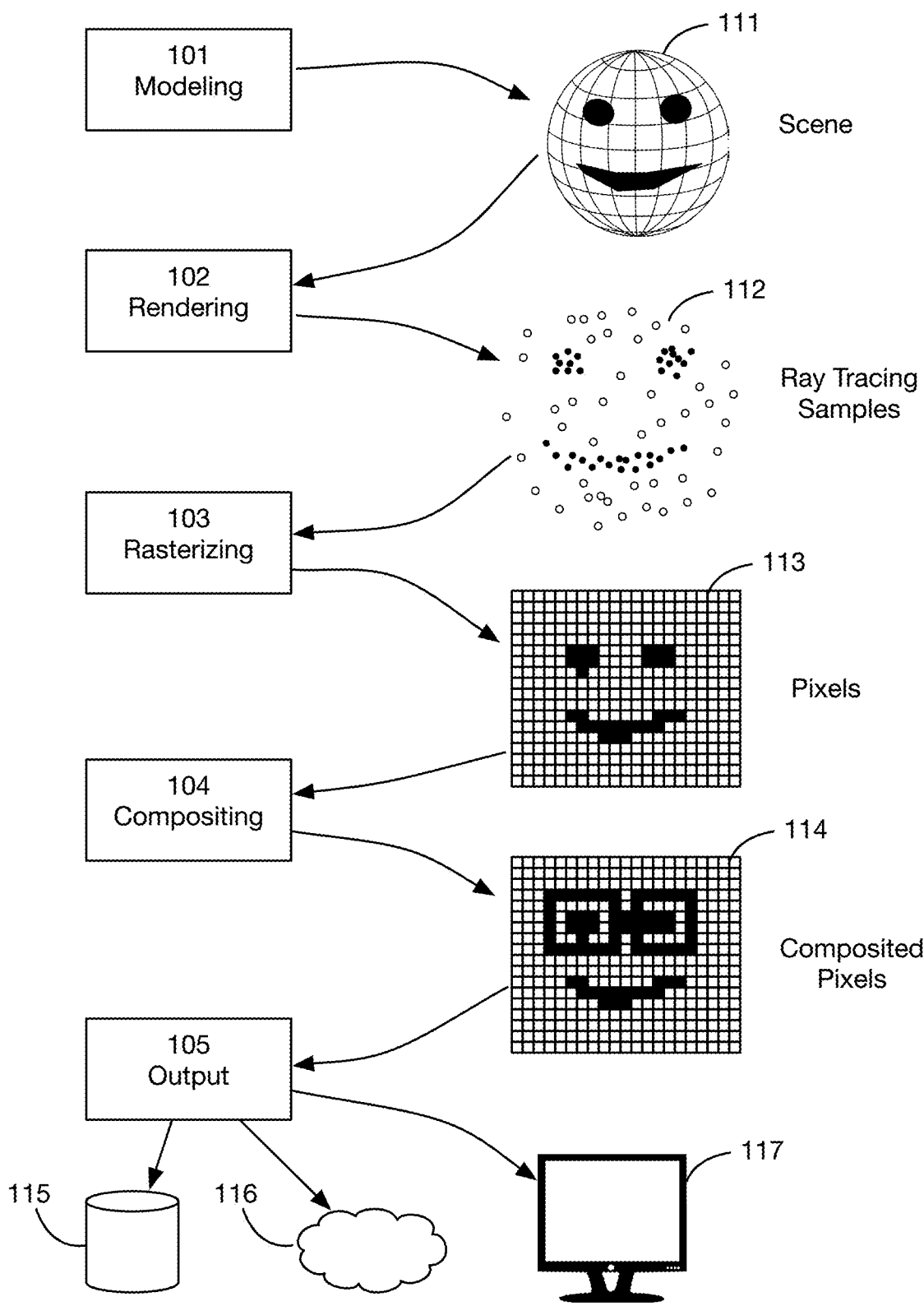
FIG. 1 shows a typical image processing pipeline known in the art, which rasterizes images into pixels prior to compositing.

FIG. 1 shows a typical image or video production pipeline employed in the existing art. A modeling process 101 creates a three-dimensional scene 111. This modeling process may for example include any or all of geometric modeling, texturing, lighting, rigging, and animating. The scene 111 is input into a rendering process 102, which renders the scene from one or more viewpoints. While multiple rendering techniques are known, current state of the art rendering often uses ray tracing. Ray tracing rendering software known in the art includes for example Vray®, Arnold®, Renderman®, Redshift®, and Octane®. In rendering process 102, the rendering software generates many simulated light rays that it traces from the viewpoint to one or more objects in scene 111. In many situations, multiple rays may be traced for each pixel of a target image. In some cases, the ray tracing renderer may send sometimes thousands of 'samples' into each pixel to help figure out what the color of that pixel should be. Each sample is a sort of "finger" that touches an object in the three-dimensional scene 111. If a sample ray hits a yellow object, for example, the sample will contribute that yellow to the pixel color. Rendering software may send hundreds of these fingers into the pixel because if it only sent one, it might not properly represent an average. For example, if half of the pixel was taken up by a yellow object and the other half a green object, if the software only sent one sample in, it may show the entire pixel as either yellow or green, rather than being a mix of both. To get a prosper mix showing the average of half green and half red, the renderer needs to send multiple samples into it. The more samples sent, the better and more accurate the average. All rendering software works this way, sending these samples into the pixel to get an average color of the pixel.

The output of the rendering process 102 is a set of ray tracing samples 112, each of which represents data on the intersection of a simulated light ray with one or more objects in scene 111. As described above, there may be multiple samples per pixel. The samples 112 are input into rasterizing process 103, which converts the samples into pixels 113. For example, the color of all of the samples within a pixel boundary may be averaged by the rasterizer to form the color of each pixel. A drawback of this rasterization prior to compositing is that all of the detail at the subpixel level that was generated by the renderer is lost during rasterization. For example, the rendering software may have calculated hundreds of samples in each pixel, but after rasterization the only information that remains is the average color per pixel. The rendering engine therefore generated potentially hundreds of times the data that is made available to compositing after rasterization 103.

In the traditional pipeline known in the art, pixels 113 are input into compositing process 104. Many types of compositing operations may be performed, such as for example, without limitation, changing colors, sizes, boundaries, textures, and shapes of objects; adding and removing objects; merging objects that may have been rendered from different scenes or different parts of a scene; and integrating computer generated elements with captured photographs or videos. In the traditional pipeline, these compositing operations are performed at the pixel level on rasterized image 113. The resulting compositing pixels 114 are then output 105, for example to a storage medium 115, to a network 116, or directly to a display 117.

Figure 2A:
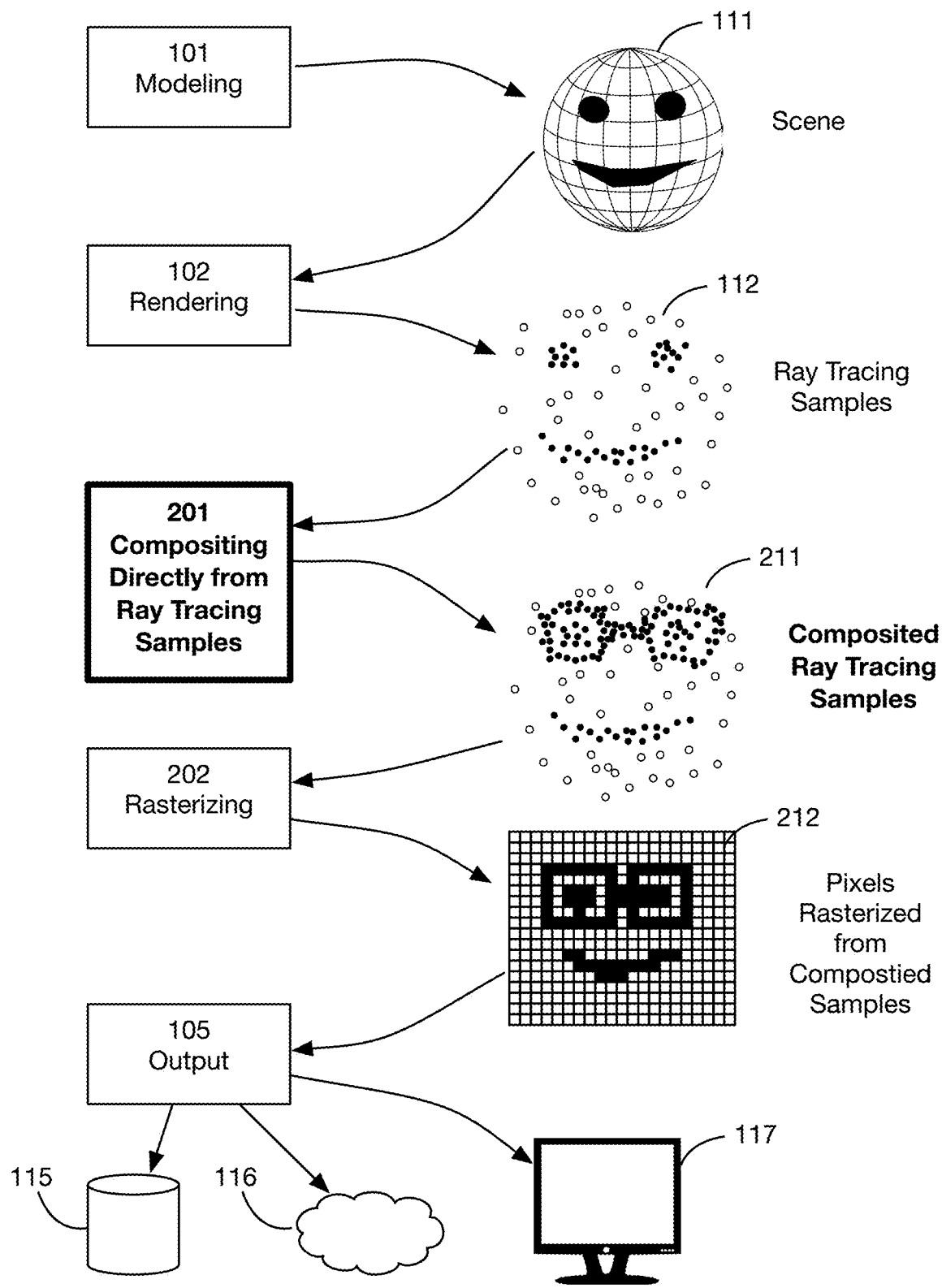
FIG. 2A shows a flowchart of one or more embodiments of the invention, wherein ray tracing samples generated by rendering are input directly into compositing, and images are rasterized into pixels after compositing.

FIG. 2A illustrates a pipeline enabled by one or more embodiments of the invention. This pipeline differs from that of FIG. 1 in that compositing operations 201 are performed directly on ray tracing samples 112. Compositing operations 201 generate composited ray tracing samples 211, rather than a modified pixel image as in the flowchart of FIG. 1. These composited ray tracing samples 211 are then input into rasterizing process 202, which occurs after compositing as opposed to prior to compositing as in FIG. 1. Pixels 212 are then output to process 105 to storage, network, or display as in FIG. 1.

Figure 2B:
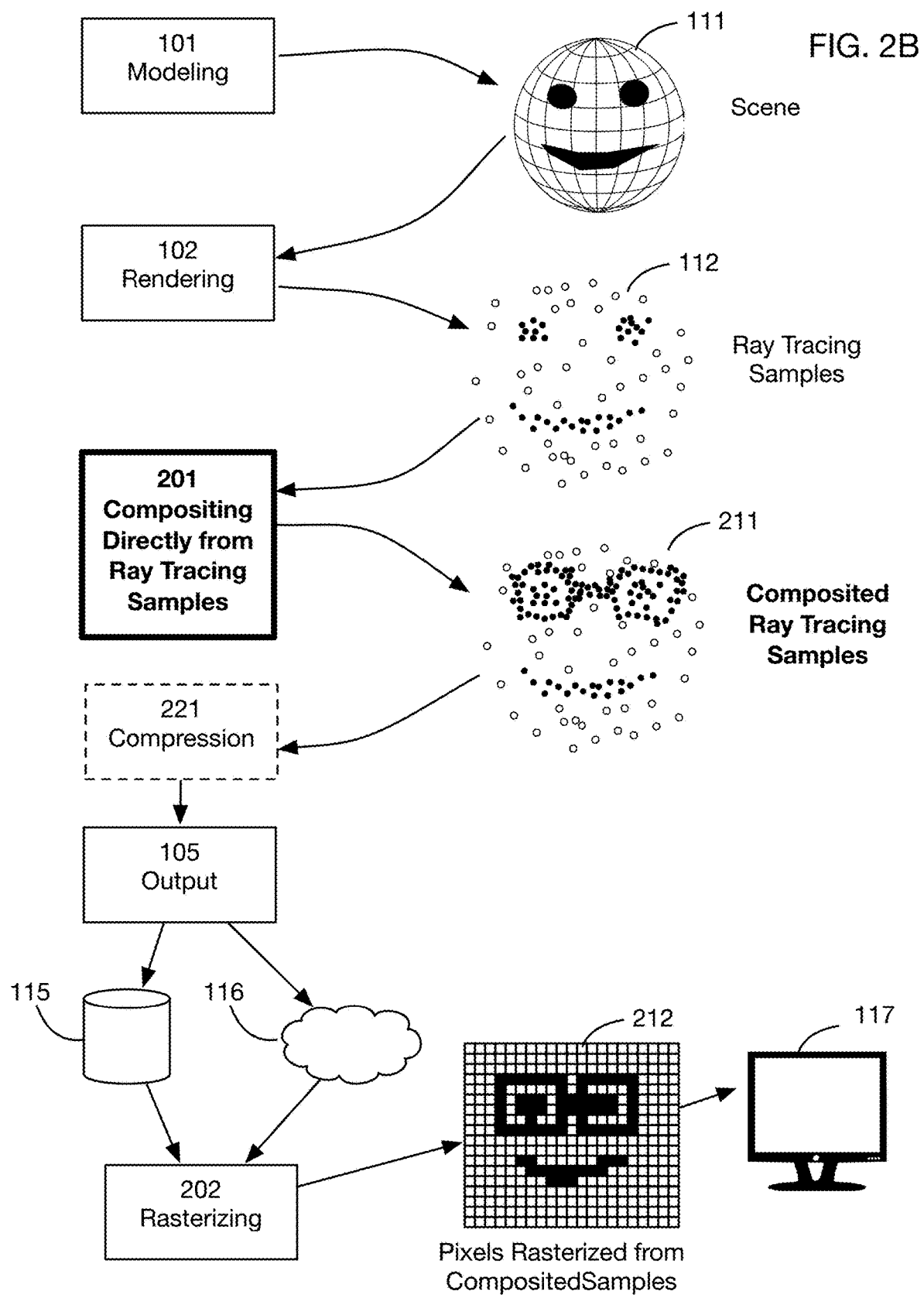
FIG. 2B shows a variation of the pipeline of FIG. 2A, where composited ray tracing samples are stored or transmitted (potentially after compression), and are rasterized thereafter at display time.

FIG. 2B illustrates a variant of the pipeline of FIG. 2A that may be used in one or more embodiments of the invention, wherein rasterization 202 is further postponed until after output 105. Specifically, composited ray tracing samples 211 may be output in process 105 to storage 115 or to a network 116, and then rasterized afterwards at display time to rasterized image 212 that is sent to display 117. Because in some situations there may be very many ray tracing samples 211 with very detailed information, in one or more embodiments there may be a further compression step 221 to compress the size of the ray tracing samples before output to storage or to a network.

FIG. 3 shows another variant of the pipeline of FIG. 2A, where a resolution selection step 301 may occur prior to rasterizing 202. The resolution may be selected for example by an operator, or it may be selected automatically to match for example the optimal or maximum resolution of an available display. Rasterizing 202 may therefore result in pixel images of varying resolution, such as for example medium resolution image 212, low resolution image 212a, and high-resolution image 212b. This support for multiple resolutions is one potential benefit of compositing directly from ray tracing samples, since the high detail of these samples, which may be usable for higher resolution images, would otherwise be lost if the image is prematurely rasterized to a lower resolution (as in FIG. 1).

Figure 4:
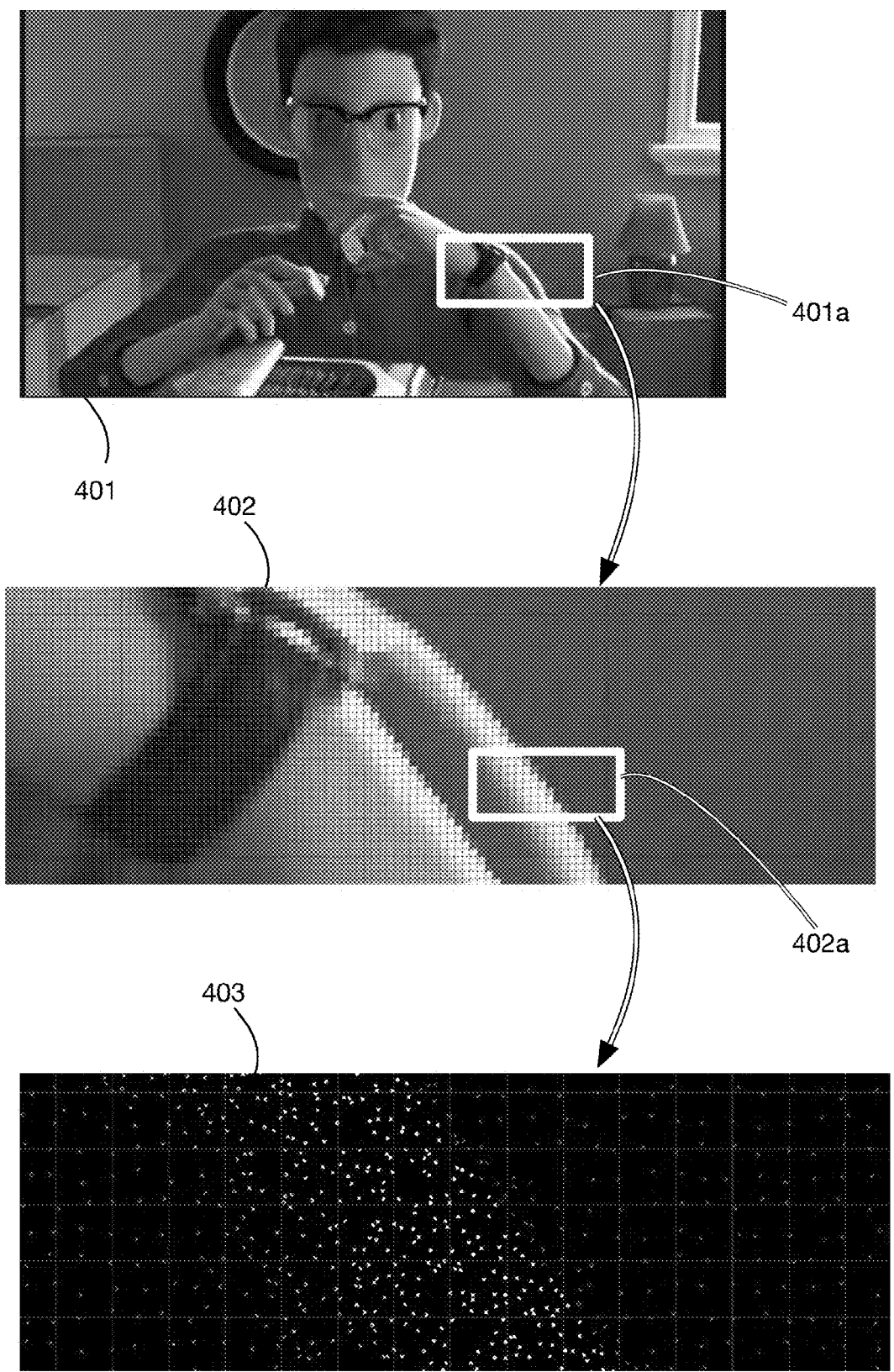
FIG. 4 shows an example of ray tracing samples generated by a ray tracing renderer; the illustrative ray tracing samples are at subpixel resolution, and are in an irregular pattern to prevent artifacts.
Figure 5:
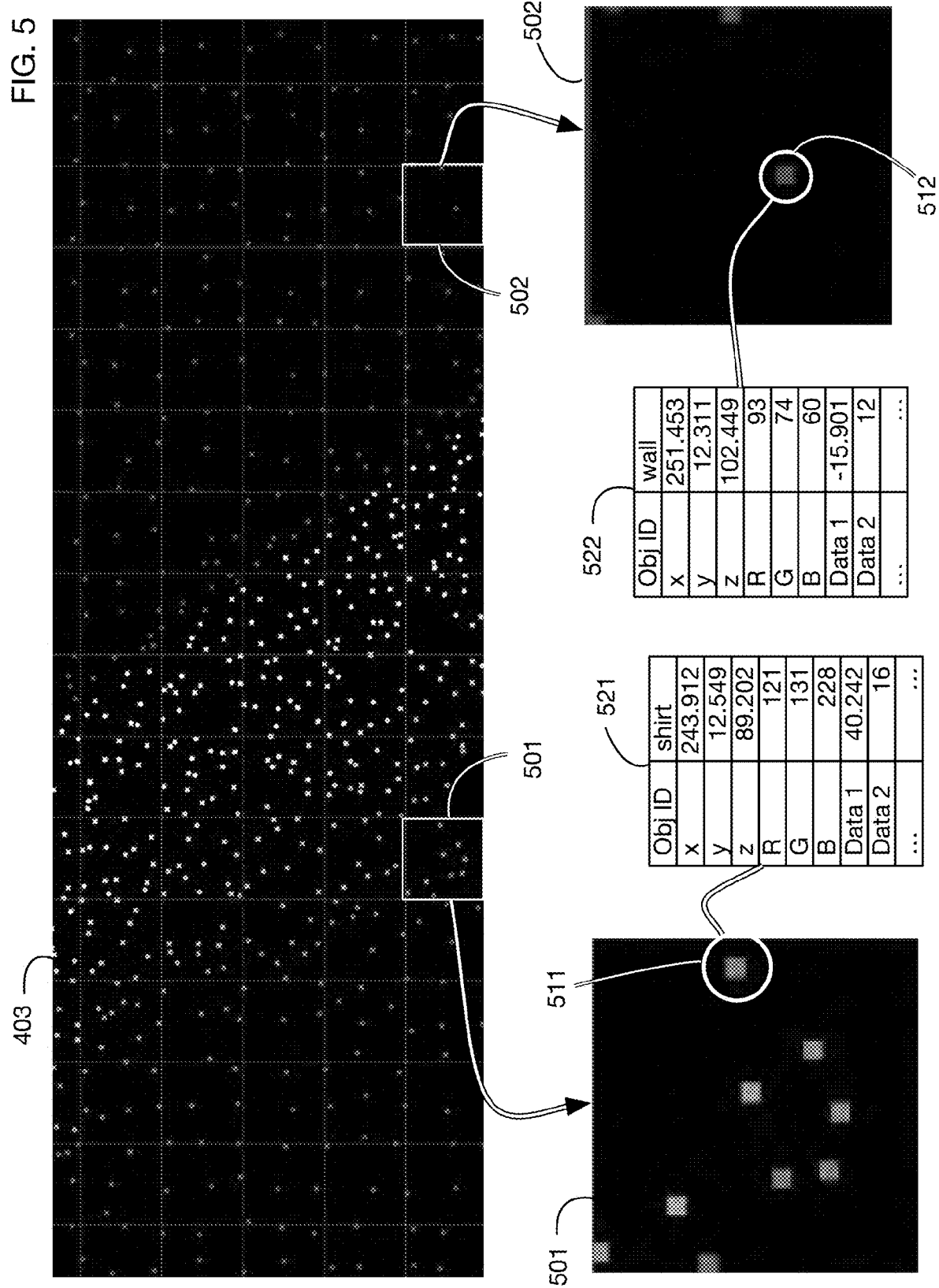
FIG. 5 continues the example of FIG. 4 to show individual ray tracing samples in two illustrative pixels, and to indicate the type of data that may be associated with a ray tracing sample.

FIG. 4 and FIG. 5 illustrate ray tracing samples generated for a realistic image. These figures also show the image and the ray tracing samples in color, which is a typical application. In FIG. 4, image 401 contains several computer modeled objects, such as a person with a shirt and a watch. Image 402 shows a close-up view of region 401a in image 401. A grid is overlaid onto image 402 to show potential pixel boundaries when image 401 is converted to a raster image. Image 403 is a further close-up view of region 402a of region 402. This image 403 shows individual ray tracing samples that were generated by a ray tracing renderer that rendered the scene 401. (Samples are shown as colored points; the black background represents areas without samples.) Each sample corresponds to a point in space where a simulated light ray intersects an object in scene 401. The color of the point corresponds to a color determined by the renderer for the intersection.

FIG. 5 continues a drill-down into the images of FIG. 4. Close-up views are shown of pixels 501 and 502 of region 403. Within each pixel there are multiple ray tracing samples. For example, sample 511 is shown within pixel 501, and sample 512 is shown within pixel 502. Associated with each sample is a data structure of sample information that is generated by the renderer for that sample. Sample information 521 for example is associated with sample 511, and sample information 522 is associated with sample 512. Sample information may include for example, without limitation: the identity of an object that the sample ray intersects; the location of the intersection, which may be a two-dimensional or three-dimensional point or may be coordinates in any desired coordinate system; the color of the point, which may be in RGB or any desired color space; and any auxiliary data corresponding to any values that the renderer may obtain or generate for the sample.

FIG. 5 illustrates an important characteristic of the ray tracing samples that may be obtained in one or more embodiments of the invention: the samples may be distributed irregularly across the pixels and irregularly within pixels. Different pixels may contain different number of samples; for example, pixel 501 contains 9 samples, and pixel 502 contains only 2 samples. Ray tracing renderers may vary the number of samples per pixel deliberately, for example in order to obtain greater detail at the edges of objects. The location of samples across and within pixels may also not follow any regular pattern or grid. Ray tracing renderers may deliberately generate randomized or pseudo-random ray directions and sample locations in order to prevent artifacts such as Moiré patterns. As a result, one or more embodiments of the invention are configured to obtain and manipulate ray tracing samples with irregular sample locations. This feature has important implications for the organization of sample storage, since samples are not aligned on a regular grid like pixels. This represents a significant difference from the prior art that performs compositing operations on pixels, since images rasterized into pixels may be stored in regular arrays in memory or on disk. For ray tracing samples, more sophisticated storage and access methods are required since samples may be at any locations in any potentially irregular pattern across and within pixels. Prior art systems that rasterize initially are vulnerable to piracy and must encrypt entire images, i.e., that are not stored as separate rays and colors in an irregular pattern as embodiments of the invention store data.

Having obtained or received ray tracing samples such as for example those illustrated in FIG. 5, one or more embodiments of the invention may manipulate these samples via various compositing operations. These compositing operations may directly access and modify the samples, with rasterization occurring after composting. This approach contrasts with the typical operations of compositing known in the art, which access and manipulate images at the level of pixels. We illustrate this contrast between the prior art and the invention with a specific compositing operation: selection of an object and modification of its color. This specific operation is illustrative; one or more embodiments of the invention may perform any desired compositing operation via direct access and manipulation of ray tracing samples.

FIG. 6 illustrates a method known in the art for this compositing operation. In step 601, the compositing subsystem obtains a rasterized image 401 from the renderer. For illustration, we show the operation of changing the color of the shirt in image 401. Because rasterized image 401 is simply an array of pixels, the shirt itself is not separately identified in the image. Therefore, to perform the color change operation, the compositing subsystem must obtain a list of the pixels associated with the shirt object, in step 602. This list of pixels associated with an object is typically obtained as a binary mask 603. Because the objects to be manipulated in compositing are not known in advance, a mask must generally be obtained for each operation via a request to the renderer to generate one or more object masks. This requirement for object masks when compositing from rasterized pixels requires additional time and processing, which is inefficient compared to directly manipulation of ray tracing samples as described below. After obtaining mask 603, the compositing subsystem performs operation 604 to modify the color of the masked pixels, resulting in modified rasterized image 605.

Image 607 is a close-up view of section 606 of modified rasterized image 605, after the compositing operation of changing the shirt's color. This image 607 illustrates another limitation of the prior art: when compositing from pixels, object edges become pixelated with an unnatural appearance. This artifact is apparent in image 607, which shows a very unnatural hard edge between the modified pixels of the shirt and the background. Ray tracing renderers typically generate multiple samples per pixel precisely to avoid this type of hard edge artifact; by blending multiple samples within a pixel at object edges, renderers may create more realistic looking edges without the pixelated appearance of image 607. However, because images have been rasterized prior to compositing (in the prior art), the information generated by the renderer is not available, and the natural appearance generated by the renderer is lost in compositing. While it is possible to compensate to some degree for these issues by applying additional pixel filtering operations in compositing, these compensating steps require additional work and do not yield optimal results.

Figure 7:
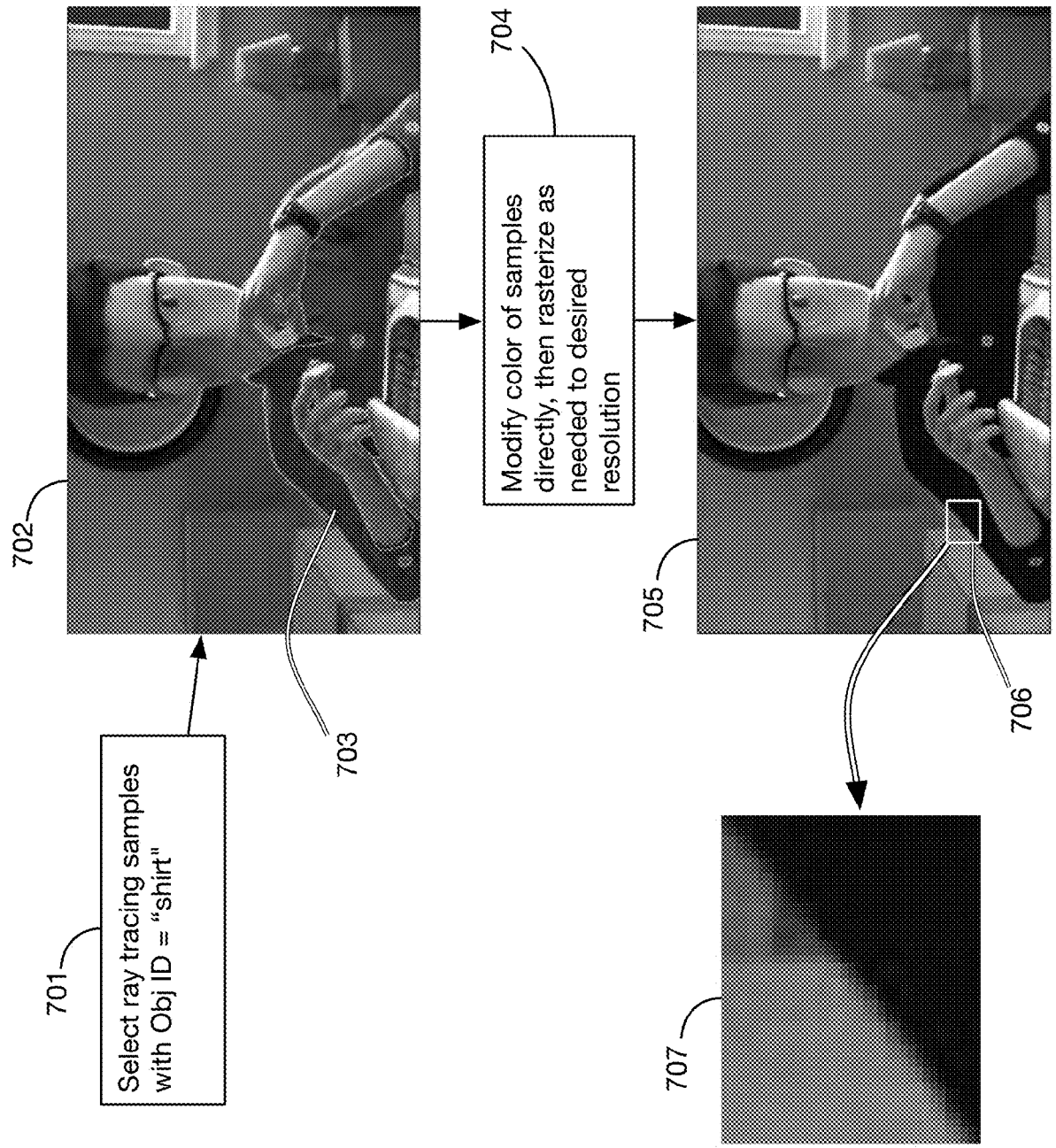
FIG. 7 illustrates how the color change compositing operation shown in FIG. 6 may be performed using one or more embodiments of the invention: ray tracing samples associated with the object are selected and are manipulated directly; this approach results in more natural edges since all of the ray tracing samples are employed in the compositing operation.

In contrast to the steps shown in FIG. 6, FIG. 7 illustrates a method that may be used in one or more embodiments to perform an object color change compositing operation. This method operates directly on the ray tracing samples obtained by the renderer. Because these samples may be tagged directly with the object identity associated with each sample, objects may be selected efficiently and directly in step 701, which in this example selects all ray tracing samples with an object identity matching the shirt. This selects a set of samples 703 in image 702. In contrast to the workflow of FIG. 6, no additional mask need be obtained from the renderer to select any object. In step 704, the compositing subsystem then directly modifies the color of the selected samples, resulting in modified image 705. Image 707 shows a close-up view of region 706 of image 704. In this case the edge between the shirt and the background retains a natural appearance with a soft boundary, in contrast to the hard, unnatural edge of image 607 of FIG. 6. This natural edge is possible because compositing retains all of the ray tracing samples for each pixel; hence the modified shirt samples may be blended with background samples at pixels on the edges.

While FIG. 7 illustrates a compositing operation of changing an object's color, one or more embodiments may apply similar methods to any desired compositing operation. Objects may be selected by selecting the samples tagged with the identity of the desired objects. Samples may then be manipulated in any desired manner. For example, without limitation, objects may be moved, resized, reshaped, recolored, retextured, hidden, or shown, by modifying the information associated with each ray tracing sample. Ray tracing samples from different renderings or different scenes may also be combined in any desired manner.

Figure 8:
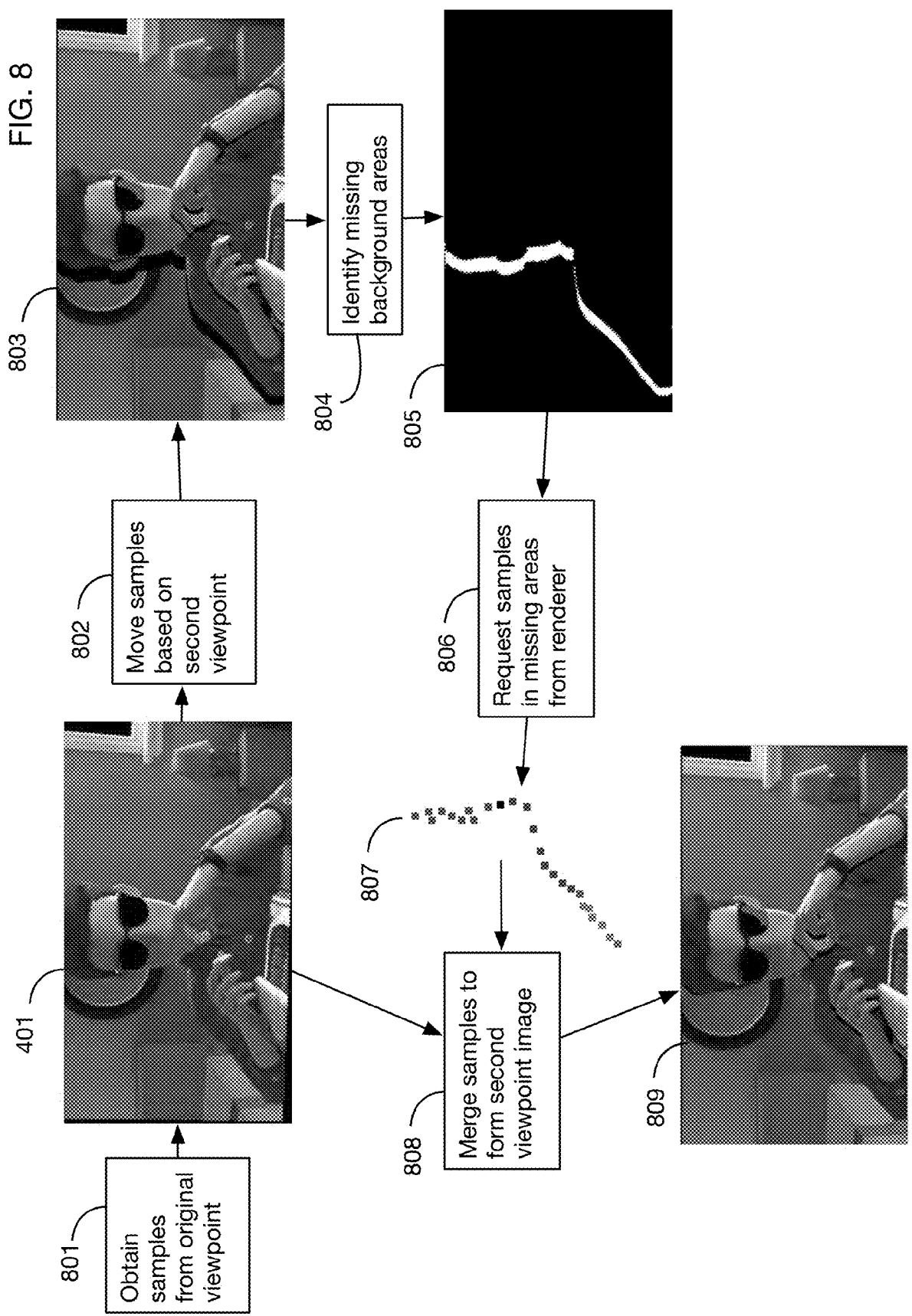
FIG. 8 illustrates generation of a second viewpoint of an image using one or more embodiments of the invention. Since the modified viewpoint may expose new areas of the background that were not rendered for the original image, one or more embodiments of the invention may request new ray tracing samples for these areas and merge these samples with samples from the original image to form a second viewpoint image.

FIG. 8 illustrates another compositing operation that may be supported by one or more embodiments of the invention: generating an image from a different viewpoint. This operation may for example be useful in generating stereo images, or in converting images or videos from 2D to 3D. Although this operation may be performed by rerendering an entire scene from a different viewpoint, it may also be done in compositing by directly manipulating the samples, thereby avoiding a full rerendering. In step 801, ray tracing samples of image 401 are obtained from an original viewpoint. The compositing subsystem then performs step 802 to move the sample locations based on a second viewpoint, resulting in modified image 803. This transformation may expose areas of the background without samples, since these areas were occluded in the original viewpoint but are visible from the new viewpoint. Therefore, the system performs step 804 to identify missing background areas 805. To complete the generation of the new image from the new viewpoint, these missing background areas must be filled. In step 806, new samples in the missing areas are requested from the renderer, resulting in new samples 807, and in step 808 these samples are merged with the original image 401 to generate new image 809. Although it was necessary to invoke the renderer, the rendering process is limited to the small area 806 of missing background. Therefore, this process is in general much more efficient than performing an entire rerendering from a second viewpoint.

Figure 9:
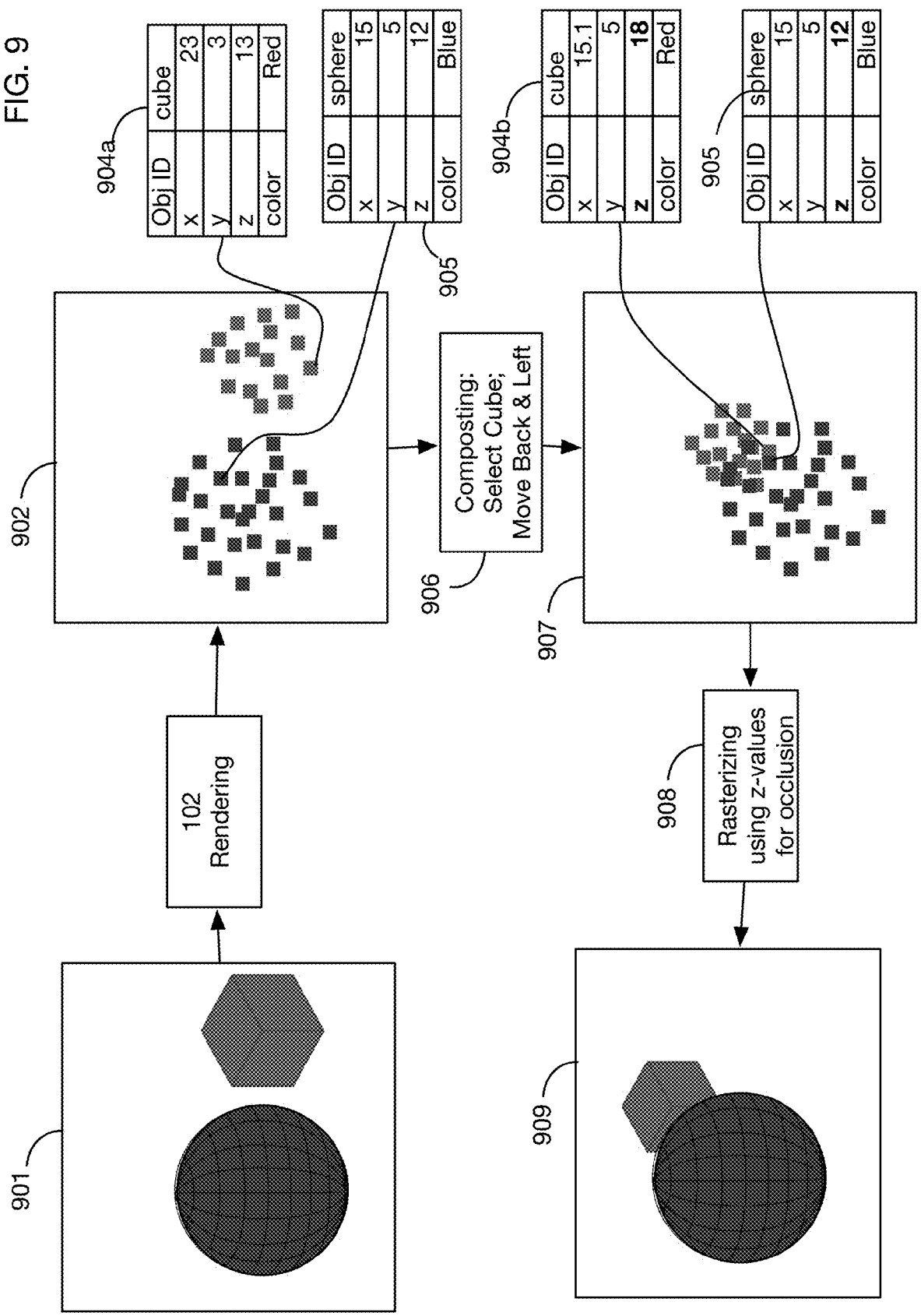
FIG. 9 illustrates a compositing operation using one or more embodiments of the invention that uses the three-dimensional location of ray tracing samples to determine when one object occludes another after a compositing operation changes the objects' relative location.

The ray tracing samples accessed and manipulated by the compositing subsystem may have associated location information, which may for example include the three-dimensional position of the point in the scene where the sample was obtained by the renderer. With this three-dimensional information, the compositing subsystem may support repositioning of objects in three-dimensional space. This three-dimensional repositioning is difficult or impossible with traditional compositing software, since images are obtained as two-dimensional pixel arrays without three-dimensional spatial information. FIG. 9 illustrates a three-dimensional repositioning compositing operation supported by one or more embodiments of the invention. Scene 901 is input into rendering step 102, which generates ray tracing samples 902. The scene 901 consists of a blue sphere and a red cube. The rendered samples 902 are point clouds of samples, where each sample has a three-dimensional location. For example, sample 904*a* is a point of the cube, and sample 905 is a point of the sphere. In addition to the x, y, and z coordinates of each sample, the renderer associates an object identity and a color (and potentially other data values as well) with each sample. Operation 906 is then performed to select the cube and to move it to a different location in space; in this example, the cube is moved left and back, such that part of the cube is behind the sphere. This operation modifies the location data associated with samples of the cube; for example, sample data 904*a* is updated to data 904*b*, with modified x, y, and z values.

After the move operation 906, the point clouds for the cube and the sphere in modified samples 907 are overlapping in their x-y coordinates. Nevertheless, because the full three-dimensional position of each sample is retained, it is possible to rasterize these samples correctly to show the objects correctly from the perspective of the viewer in resulting image 909. In particular, considering sample 904*b* of the cube and sample 905 of the sphere, rasterizing operation 908 correctly shows the blue sphere in front of the red cube since the z value in sample 904*b* is greater than the z-value of sample 905. (Greater z values correspond to objects further away from the viewer in this example.) Compositing directly from ray tracing samples therefore allows objects to be repositioned in three-dimensional space without losing information. In contrast, this type of three-dimensional compositing is difficult or impossible in the prior art, since the two-dimensional pixel information available to the compositing subsystem does not retain three-dimensional data.

Figure 10:
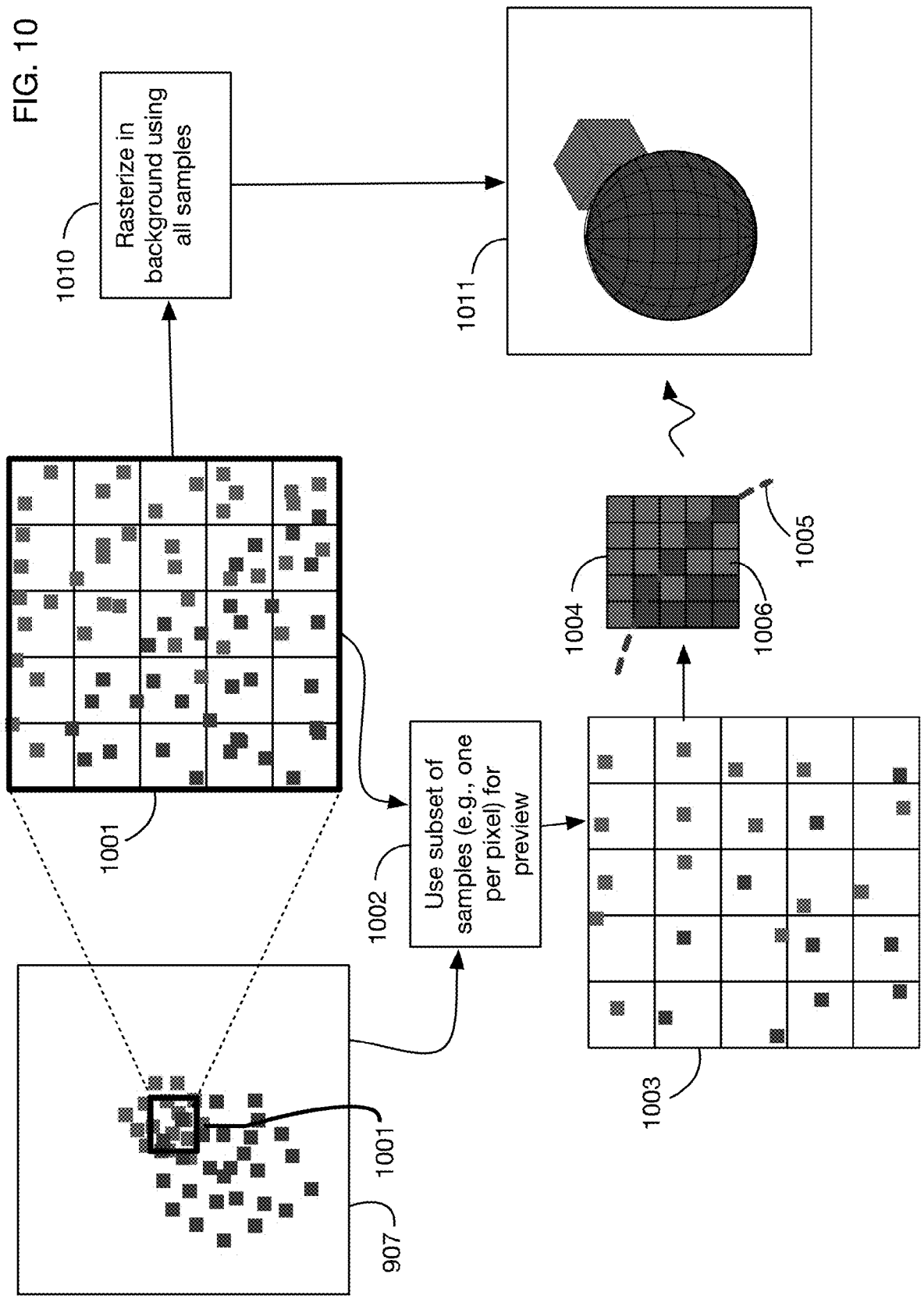
FIG. 10 illustrates a preview capability enabled by one or more embodiments of the invention, wherein a lower quality preview image may be generated relatively quickly using a subset of the ray tracing samples; a higher quality image may be generated in the background and displayed afterwards.

During compositing, it may be desirable to generate images frequently or repeatedly from the modified samples to view the effects of the compositing operations. Generating these images generally requires rasterizing the modified samples and transmitting the rasterized images to a display. With a large number of ray tracing samples, potentially hundreds per pixel, repeatedly rasterizing and displaying these images may be time-consuming and may introduce delays in the compositing process while an operator waits for an image to be displayed. Therefore, one or more embodiments of the invention may employ an optimization that generates preview images using a subset of the ray tracing samples. FIG. 10 illustrates this process. Ray tracing samples 907 have been modified by a compositing operation as described with respect to FIG. 9, and an operator for example wants to view the results. Region 1001 within the image shows a close-up view of the samples available, distributed across pixels. Many pixels contain multiple samples. To speed up generation of a preview image, step 1002 is performed to select a subsample of the samples and to use this subsample for the preview. For example, without limitation, a single sample per pixel may be selected to generate a preview. This approach is illustrated in image 1003, where a single sample per pixel is selected for the pixels in region 1001. One or more embodiments may select a subsample in any desired manner. For example, without limitation, samples may be selected randomly within or across pixels, a single or a small number of samples per pixel may be selected, or one or more samples within a pixel or region may be selected based on simplicity or speed of access (such as selecting the first sample in a list of samples within a pixel or region).

A preview image is then generated from the subsample. Image 1004 shows a portion of a preview image generated from the subsample 1003 corresponding to region 1001 of the full image. Because some of the samples in 907 are not used in generating preview 1004, artifacts are visible in the preview image. For example, pixel 1006 is red even though it is within the boundary 1005 of the blue sphere. Artifacts such as these may be acceptable as a tradeoff for rapid generation of preview images during compositing. In one or more embodiments, an operator or the system may be able to select a quality level for preview images and may generate subsamples to correspond to the quality level. For example, a higher quality level may result in selection of more samples per pixel for a preview image, thereby reducing the number or severity of potential artifacts.

In one or more embodiments, a higher quality image or full quality image may be generated in the background while a lower quality preview image is displayed. Parallel generation of this image in the background may occur for example on one or more cores of a multiprocessor, or via graphics processing unit hardware. The system may swap out the preview image and replace it with the full quality or higher quality image when the background processing is complete. In FIG. 10, process 1010 occurs in the background (for example, on a graphics processing unit) and generates a full quality image 1011 from the full set of samples. When this image 1011 is available, it is displayed in place of or in addition to preview image 1004. One or more embodiments may generate multiple images in the background, for example at progressively higher levels of quality, and display each as it becomes available.

FIG. 10A shows another example of selecting an image quality by changing the number of samples used per pixel. User interface control 1021, which may for example be incorporated into a compositing subsystem, may be used to select the number of samples. In control 1021, the number of samples per pixel is set to 1; this results in image 1022, which has a grainy appearance. In control 1031, the number of samples per pixel is increased to 13, which results in a more natural image 1032 with a less grainy appearance.

Figure 11:
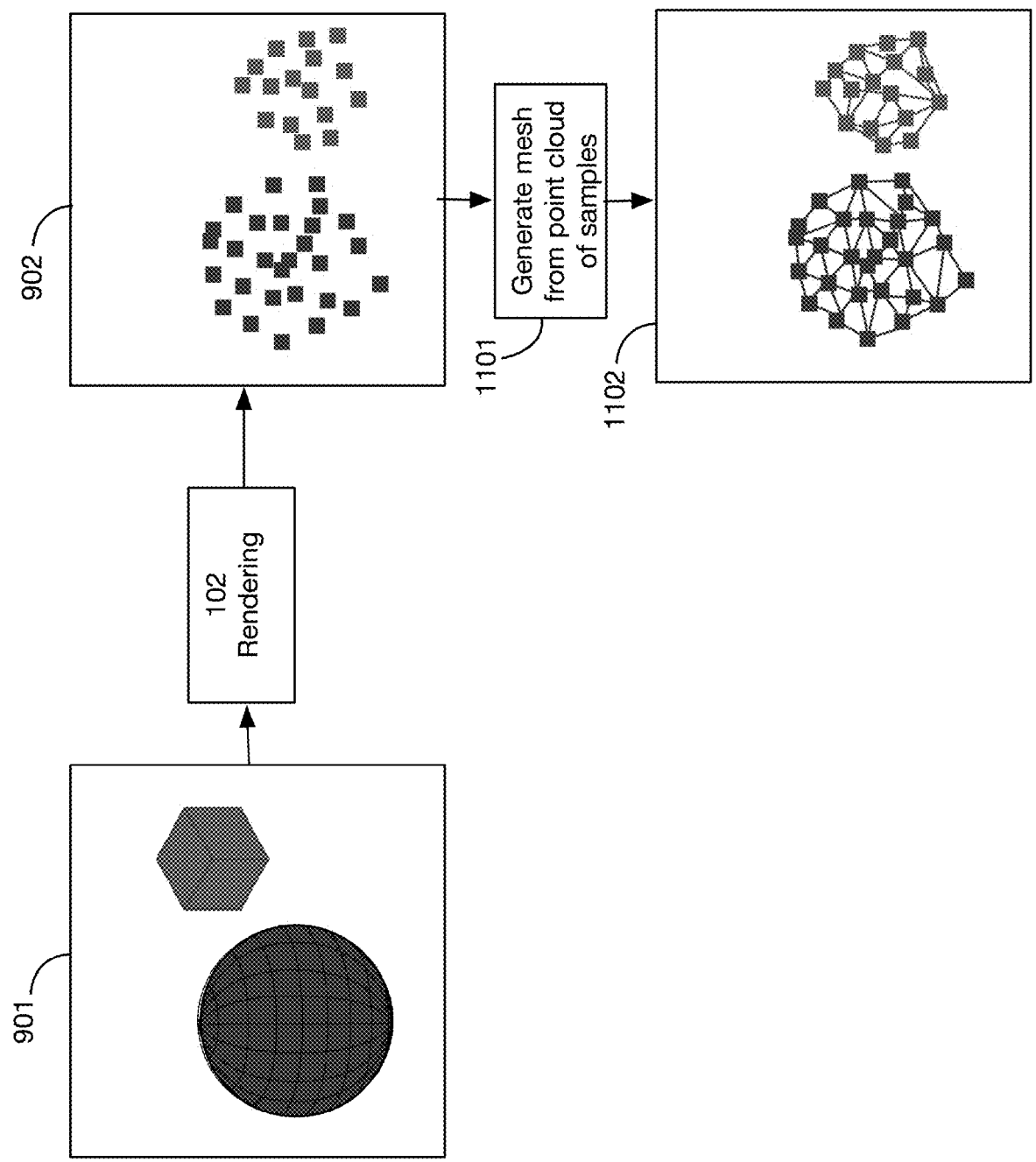
FIG. 11 illustrates generation of a mesh from the point cloud associated with the ray tracing samples.

In addition to or instead of generating a raster image from composited ray tracing samples, one or more embodiments may generate a mesh, for example using the samples as the vertices of the mesh. This is illustrated in FIG. 11, where step 1101 generates mesh 1102 from the ray tracing samples 902. The mesh 1102 may be used instead of or in addition to a pixel image. The mesh may for example be colored with the color of each vertex corresponding to the color of the sample. Separate meshes may be generated for different objects, as illustrated in 1102 where one mesh is generated for the sphere object and a different mesh is generated for the cube object.

FIGS. 12A and 12B illustrate generation of a mesh for an object from a realistic scene, specifically for the shirt object from the scene shown in image 401 of FIG. 4. The ray tracing samples obtained for a scene may have three-dimensional location information for each sample; this three-dimensional sample information allows the scene to be viewed from any perspective during compositing, as illustrated in FIG. 12A. Images 1201 and 1202 shows different views of the three-dimensional samples from the scene from image 401 in FIG. 4, as the viewpoint is rotated towards the left. These views may be generated for example using the preview procedures described above. FIG. 12B shows individual samples and a resulting mesh for a portion 1203 of the shirt object selected from the scene in compositing. The samples associated with any object may be selected directly since the sample information may include an object identifier. Samples from the shirt object are shown in 1211 (which corresponds to region 1203 of image 1202 in FIG. 12A), with 1212b showing a close-up view of portion 1212a of 1211. Mesh generation 1101 may be performed on these samples to generate a mesh 1221 for the shirt, with 1222b showing a close-up view of portion 1222a of this mesh.

One or more embodiments may support compositing operations that combine or merge ray tracing samples from different rendering passes. These passes may be different passes of a single scene, or they may be renderings of different scenes or different parts of a scene. Because one or more embodiments may obtain, and access ray tracing samples directly, as opposed to compositing from rasterized pixel images, merging of samples is straightforward. For example, merging of samples may be performed as a simple union of the samples from different rendering passes. FIG. 13 illustrates an example. A scene containing a cube and a sphere 1301 is initially rendered by a ray tracing renderer. Image 1311 shows the samples obtained from the renderer for a single pixel 1302 of sphere 1301. In a different rendering pass, the renderer generates samples 1312 for the same pixel. For example, the second rendering pass may be requested to obtain more detail for the edge of the sphere. Combining the samples from these two rendering passes is achieved via a union of the samples 1311 and 1312, resulting in composited samples 1313. This straightforward compositing operation via a union of samples would not be possible with traditional compositing systems that operate on pixels rather than samples, since more complex and less accurate operations would be required to combine pixels from different rendering passes. Hence simple compositing of samples from different rendering passes represents a significant advantage of the invention over the prior art.

While compositing directly from ray tracing samples provides several benefits including the ones illustrated above, it poses a technical challenge in that much more information must be stored and accessed compared to compositing from rasterized pixels. Therefore, one or more embodiments of the invention may incorporate various optimizations for the storage, transmission, and retrieval of ray tracing sample data.

Figure 14:
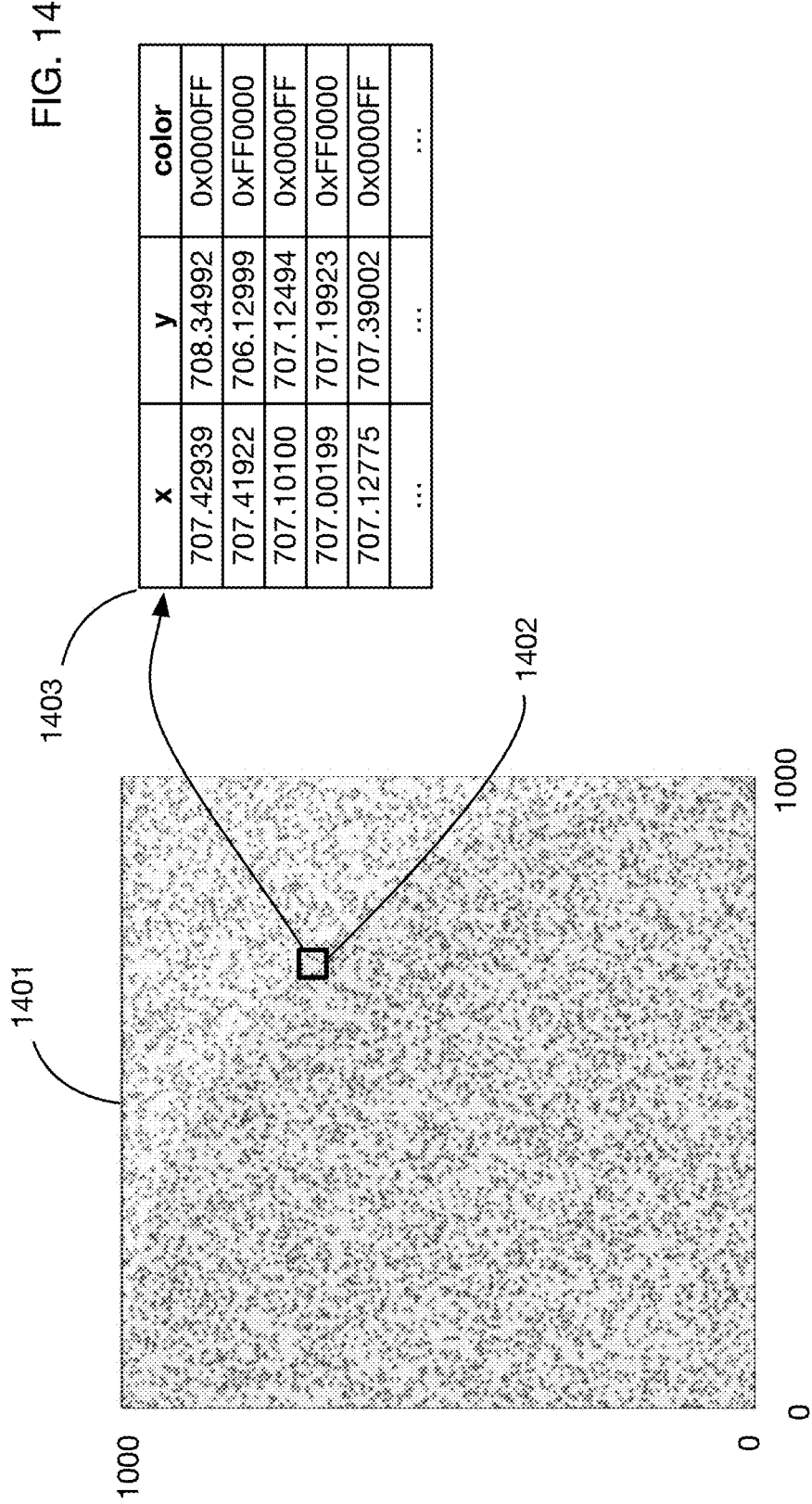
FIG. 14 shows an example of the data associated with a sequence of ray tracing samples without any storage optimizations; this unoptimized data may require for example storing floating point values for the coordinates of each sample.

FIG. 14 illustrates the challenge of storing a potentially large number of ray tracing samples. Samples 1401 are generated by a ray tracing renderer, in this example in a pseudorandom pattern. Table 1403 shows illustrative samples within region 1402 of the image. For illustration, the x and y coordinates of the samples range from 0 to 1000 in this example. Because the samples are randomized and are not aligned on a regular grid, the precise location of each sample must be stored or must be otherwise available. Thus, in table 1403, a floating-point value for the x and y coordinates is stored for each sample, along with the color of the sample point. (As described above with respect to FIG. 5, there may be other information associated with each sample point, such as an object identity; for simplicity of illustration the data shown in table 1403 is limited to the x and y position of the sample and the sample color.) Because there may be potentially many samples per pixel, and hence potentially hundreds of millions of samples for an image, the storage of full floating-point values for location coordinates may generate enormous capacity requirements for memory, secondary storage, or network bandwidth. In contrast, storing rasterized pixel images is inherently compact, since pixels are arranged on a regular grid; hence a pixel image may be stored for example as a contiguous array of colors, with pixel coordinates defined implicitly by the offset position within the array.

FIG. 15 illustrates a storage optimization for the example of FIG. 14, which may be used in one or more embodiments of the invention. In this optimization, rather than storing full floating-point coordinates for each sample, the image is divided into tiles or pixels and locations are stored relative to the tiles or pixels. For example, region 1402 of the image may be divided into a 3 by 3 grid of pixels (or of tiles of any desired size), as shown in FIG. 15. Within each pixel or tile, the floating-point coordinates of each sample are translated relative to a corner of the pixel or tile. This reduces the absolute size of the coordinates, allowing them to be stored more compactly. Thus, in FIG. 15, table 1501 corresponds to an array of pixels; each entry in the table such as entry 1502 may for example have a pointer 1503 to a table containing the sample data within the corresponding tile or pixel. The x-offset and y-offset values in table 1504 are therefore within the range of 0 to 1, requiring fewer digits and less storage space than the original x and y locations in table 1403 of FIG. 14.

FIG. 15 illustrates another storage optimization that may be used in one or more embodiments: sample locations or offsets may be stored in reduced precision. For example, the table 1504 retains only three decimal places of precision for offset values, compared to the original 5 decimal places of the sample locations illustrated in table 1403 of FIG. 14. One or more embodiments may represent locations or offsets in any desired manner, with any degree of precision or number of digits. For example, without limitation, 32-bit or 16-bit floating point values may be used instead of 64-bit double precision floating point values.

Figure 15A:
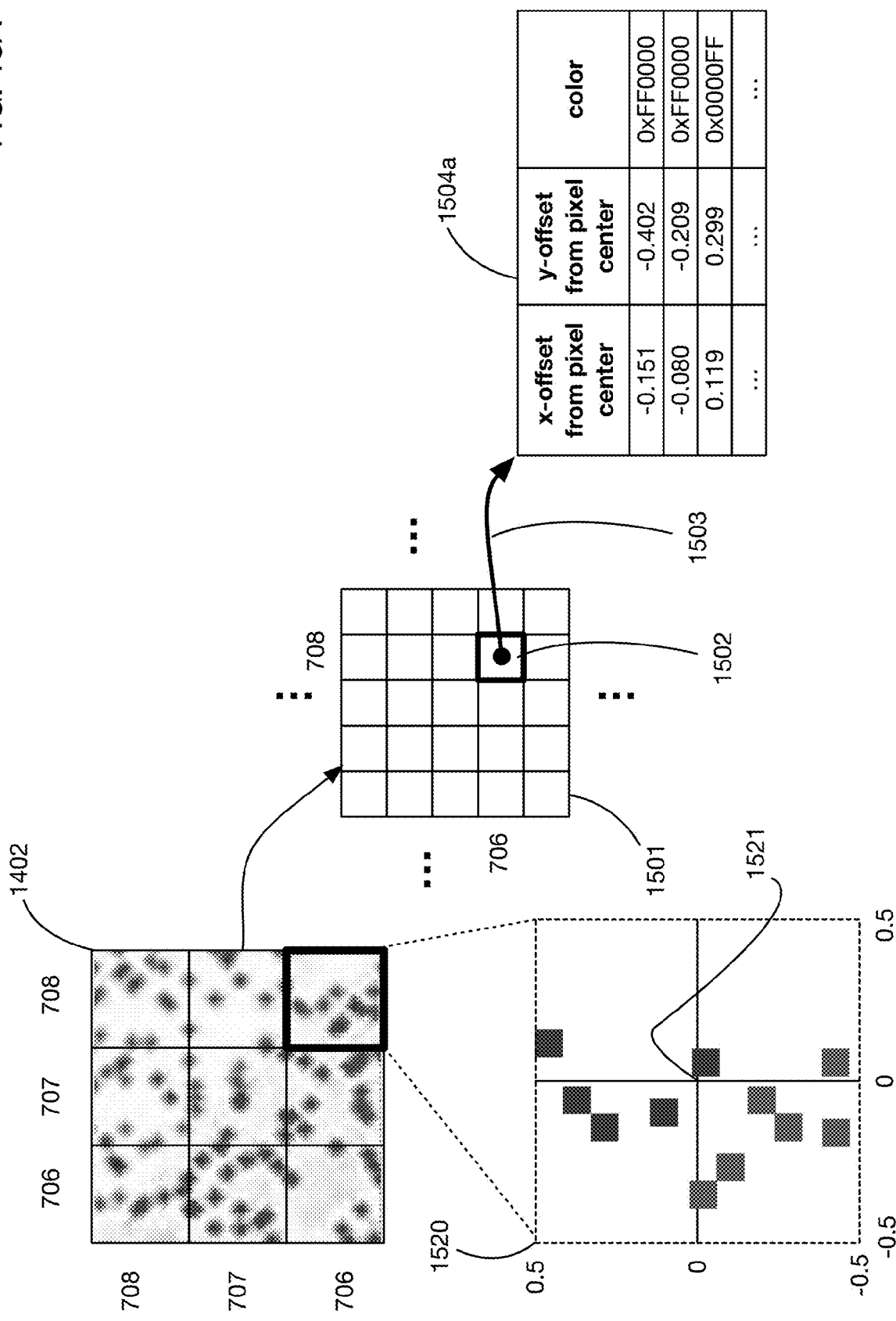
FIG. 15A illustrates a variation of the optimization shown in FIG. 15, which stores offsets relative to a pixel center rather than a pixel corner.

FIG. 15A illustrates a variation of the optimization scheme of FIG. 15; in this variation, sample location offsets are calculated relative to the center of a tile or pixel, rather than relative to a corner as shown in FIG. 15. For example, pixel 1520 has a coordinate system within the pixel with the origin at pixel center 1521. Offsets are thus reduced to the range −0.5 to 0.5 in table 1504a, which may further reduce storage requirements compared to offsets in the range 0 to 1. One or more embodiments may use any desired coordinate system or reference frame within a pixel or tile to represent sample location offsets.

FIG. 16 shows another optimization technique that may be used in one or more embodiments. In this optimization, pixels or tiles are divided into a grid of sub-regions, and sample locations are indicated by the grid position within the subregion. Furthermore, by combining samples within a subregion, sample data may be represented very compactly via a bitmask that shows which sub-regions have samples. For example, pixel 1601 in FIG. 16 is divided into a 4 by 4 grid of sub-regions. Some of these sub-regions have one or more samples; others have no samples. For each subregion, the presence of one or more samples is indicated by a "1" in a corresponding bitmask, and the absence of any samples in the subregion is indicated by a "0" in the bitmask. If there are multiple samples in a subregion, such as the two samples in subregion 1603 of pixel 1601, these samples are combined. Thus table 1602 contains the compressed sample information for pixel 1601. This data may be represented compactly as data structure 1603 associated with table entry 1502 corresponding to pixel 1601. Data structure 1603 has a 16-bit bitmask 1604 (which may be represented for example as 4 hexadecimal digits), and a list 1605 of the colors associated with those sub-regions that contain one or more samples.

FIG. 17 illustrates another storage optimization method that may be used in one or more embodiments of the invention, which stores a seed value that may be used to regenerate sample locations. Ray tracing renderers may for example use a pseudorandom number generator 1702 (for example for a Monte Carlo sampling procedure) to generate sample locations. A seed value 1701 may be provided to the pseudorandom number generator 1702 to initialize a sequence of pseudorandom values. If the same seed is provided subsequently to the generator 1702, the generator will regenerate the same sequence of values. This property allows for extremely compact storage of the sample locations, since only the seed value need be stored rather than the generated locations. For illustration in FIG. 17, generator 1702 generates a sequence of locations in image 1401, beginning with location 1711 and then location 1712. (Only a few locations are shown, but many thousands or millions of samples may be generated within image 1401.) Table 1721 shows the generated locations and corresponding colors obtained by the ray tracing renderer. Instead of storing this table directly, one or more embodiments may perform optimization 1722 to store data structure 1723, which contains the seed value 1701 along with the sequence of colors obtained from table 1721. The sample locations in table 1721 may then be recovered as needed from data structure 1723 by providing the seed value to the corresponding generator 1702, or to another generator instance that implements the same pseudorandom number generation algorithm.

A variation of this scheme that may be used in one or more embodiments is to use a different seed for each tile or pixel of an image, and to store the per-tile or per-pixel seeds, along with the colors (and other information such as object identity) obtained by the ray tracing renderer.

The storage optimization illustrated in FIG. 17 may also be used in one or more embodiments as a data security mechanism to protect the ray tracing samples from unauthorized access. For example, if an attacker obtained data structure 1723, he or she would be unable to reproduce the samples 1401 unless he or she also had access to the corresponding pseudorandom number generator 1702 that generated sample locations. The color list of 1723 by itself is insufficient to reproduce the image 1401. Even if the attacker had access to the generator 1702, the seed 1723 could be encrypted, again preventing reproduction of the samples. This security mechanism may have applications for example for rendering via cloud-based services. A studio for example may be reluctant to outsource rendering to a remote service because it may fear that the generated samples may be pirated. However, if the remote rendering service transmits only data structure 1723, and if the seed is encrypted or the pseudorandom number generator is kept private, then an attacker who obtained the data structure would be unable to reproduce the samples.

Figure 18:
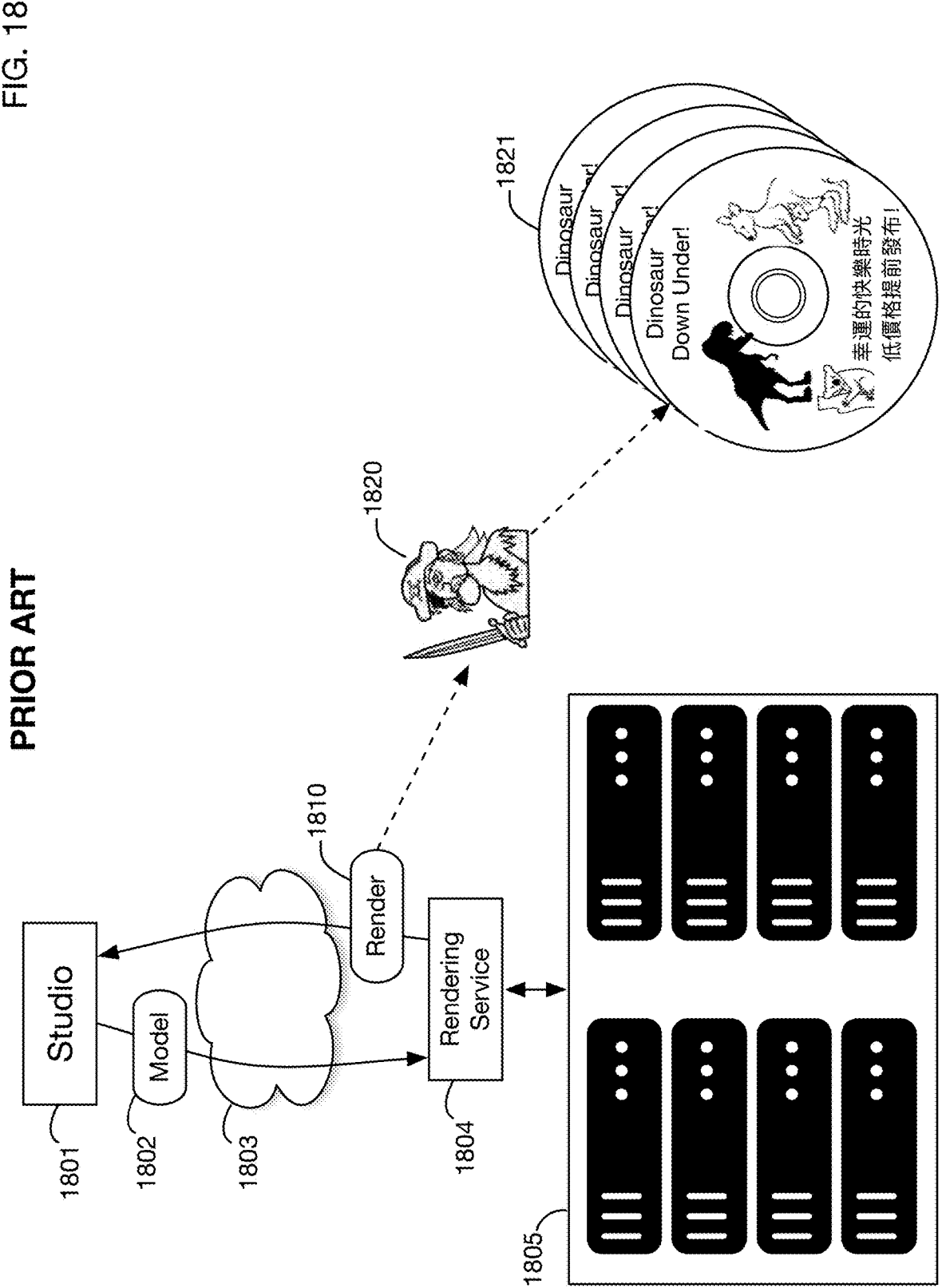
FIG. 18 shows prior art for a rendering service, illustrating the risk that rendered images may be pirated.

FIG. 18 illustrates a security challenge faced by existing rendering solutions. A movie studio 1801 needs to render an image, a video, a game, or more generally any type of graphical content. Studio 1801 may for example be a movie or television studio, a game producer, a special effects provider, or more generally any content producer. Studio 1801 provides or accesses a model 1802 that describes the scene or scenes to be rendered. Model 1802 may for example be a 2D or 3D model of objects, backgrounds, actions, effects, people, lights, reflections, materials, or any other items that may contribute to a rendered image or video. Model 1802 may also access or incorporate existing images or videos that may be merged with rendered content. Studio 1801 uses an external rendering service 1804 to render images or videos from model 1802. For example, studio 1801 may send model 1802 over a network connection 1803 to the rendering service 1804. The rendering service may for example access a set of servers 1805 or other hardware and software resources to perform rendering. The resulting render 1810 (which may for example comprise one or many images), is sent back over network 1803 to studio 1801. However, pirate 1820 surreptitiously accesses the render 1810 and uses it to create pirated and unauthorized copies 1821 of the studio's proprietary content. The pirate 1820 may for example be an employee or contractor of the rendering service, or a hacker that breaks into the rendering service's systems. This risk associated with prior art rendering systems may for example prevent the studio from using an external rendering service, even if the external rendering service provides efficient rendering due to scale or specialized resources.

Figure 19:
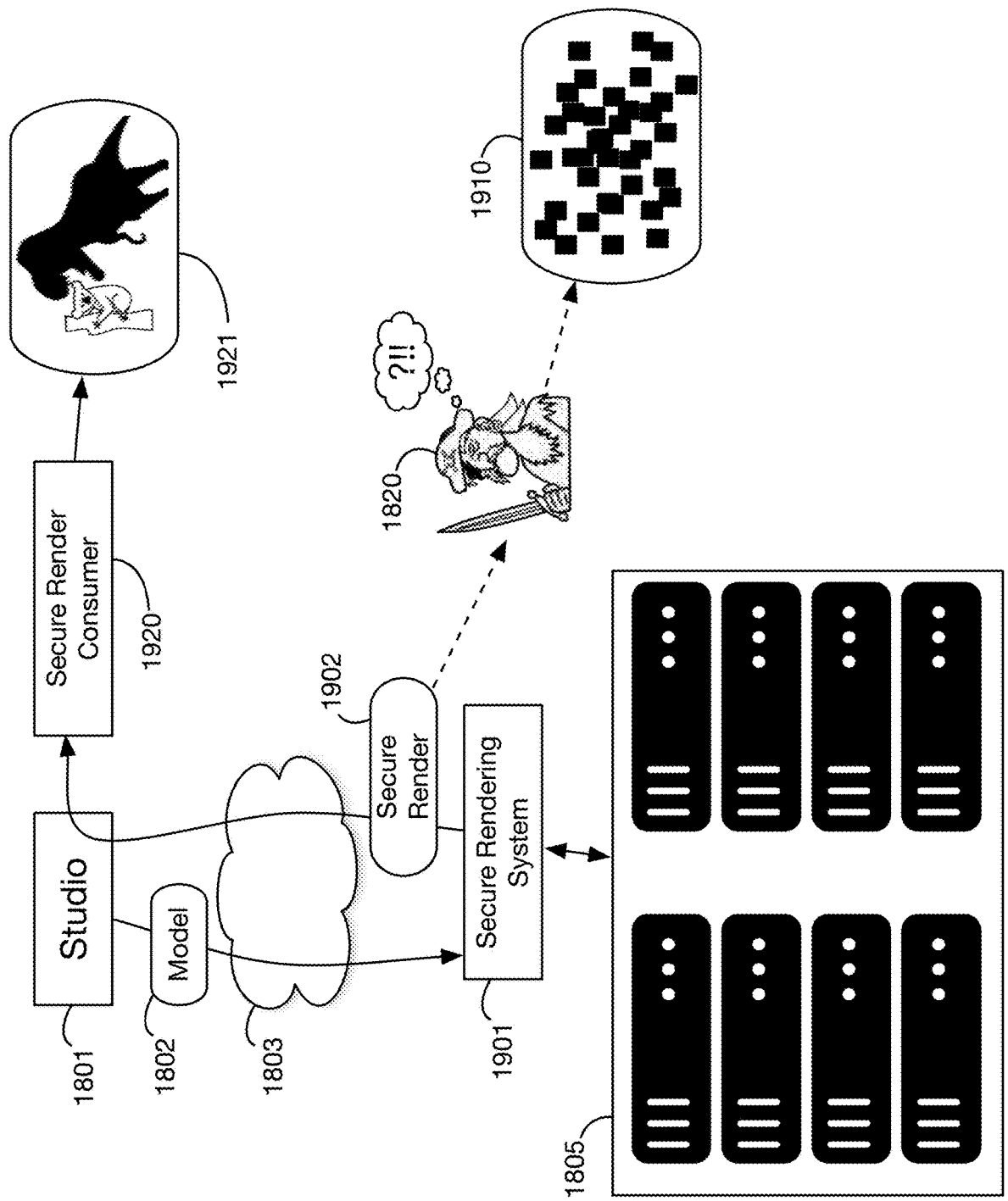
FIG. 19 shows an embodiment of the invention that prevents the pirating scenario of FIG. 18 by providing a secure rendering system that obfuscates position data so that pirated rendered images are unusable.

FIG. 19 illustrates a secure rendering system that may be provided by one or more embodiments of the invention, which may mitigate the risks of pirating illustrated in FIG. 18. In this system, secure rendering system 1901 receives model 1802 from studio 1801, as in FIG. 18, and uses hardware resources 1805 to perform rendering. However, the output of the secure rendering process is a secure render 1902, in which certain data is obfuscated, making it useless to pirate 1820 who gains access to the secure render. For example, if pirate 1820 views images of the secure render, only noise or garbage 1910 will be observed. The secure render 1902 is transmitted back to studio 1801, which uses a secure rendering consumer 1920 to reveal the obfuscated information in the secure render, resulting in correct rendered image 1921. In one or more embodiments the secure rendering system 1901 may never directly store, cache, or transmit images such as 1921, so that only the authorized secure render consumer 1920 may view the correct images.

FIG. 20 shows an illustrative embodiment of a secure rendering system that generates a secure render by scrambling the ray directions used for ray tracing. Scrambling of ray directions is an illustrative approach to generating a secure render; one or more embodiments may scramble or otherwise obfuscate any aspect or aspects of rendering data to make the secure rendering output unusable to anyone other than intended recipients. For example, without limitation, a secure rendering system may obfuscate any or all of direction, position, color, object identity, shading, lighting, geometry, shape, size, texture, or more generally any value or values generated by or used in rendering. In the illustrative example of FIG. 20, a ray tracing sample generator 2001 generates rays that are conceptually emitted from a camera position into model 1802 of a scene. Associated with each ray is an original ray direction. For example, FIG. 20 shows three illustrative rays 2002a, 2002b, and 2002c. In practice ray tracing may employ hundreds or thousands of rays, or many more, for each image. A ray direction is associated with each ray. For ease of illustration, in FIG. 20 a ray direction is indicated as a two-dimensional vector; for example, the ray direction associated with ray 2002a is (1,3). In a three-dimensional scene a ray direction may be indicated by a three-dimensional vector, or by any other parameterizations such as angles, quaternions, or other representations. One or more embodiments may represent ray directions using any desired parameterizations or representations.

Ray tracing sample generator 2001 may for example calculate the intersection of each ray with an object in model 1802 and may calculate the color of the intersection as the color of the associated sample. In one or more embodiments ray tracing may incorporate any other calculations or effects such as reflections or refractions for example. The result of the ray tracing may be for example a set of ray tracing samples 2003, where each sample includes a ray direction (or for example a position of the intersection of the ray with an object in the model) and a sample color. Samples may include other information in one or more embodiments, such as for example the identity of the object or objects intersected by the ray, or the distance or distances of this object or objects from the virtual camera.

Instead of outputting or storing ray tracing samples 2003 directly, in a secure rendering system one or more embodiments may employ a ray scrambler 2010 that modifies the samples' ray directions or related sample position data so that the rendering output is not viewable unless the rays are subsequently unscrambled. This scrambling results in a secure render 1902, which contains a set of scrambled samples that each contain a scrambled ray direction and a sample color (and possibly other data as well). The scrambled ray direction may be any data that is derived from the original ray direction, the original intersection of the ray with the objects of the model, or from any representation or parametrization of the ray or its intersections with the model. A pirate who obtained secure render 1902 would be unable to view or interpret the rendered image or images, since the scrambling of directions would make the render appear to be noise or garbage. The secure rendering system may never create a viable image; it only creates a secure render in which ray directions are scrambled. The scrambling is incorporated into the rendering process itself, so that the rendering system does not and cannot store even a temporary or cached version of an image that is viewable; in a sense the secure rendering system itself does not even know what it is rendering. This integration of security into the rendering system is distinct from a process of encrypting a rendered image after rendering, since in that case the rendering system did create a viable image (which could then be pirated) and encrypted it later. By scrambling ray directions before gathering or storing color data, e.g., before obtaining colors in the right side of table 2003, a middle man attack on the scrambler is impossible, thereby eliminating an attack vector.

To view or use the secure render 1902, a secure render consumer 1920, which may for example be authorized to unscramble the ray directions, processes the scrambled samples to obtain the unscrambled ray tracing samples 2020. These unscrambled samples are representative of or otherwise match the original ray tracing samples 2003.

Figure 21B:
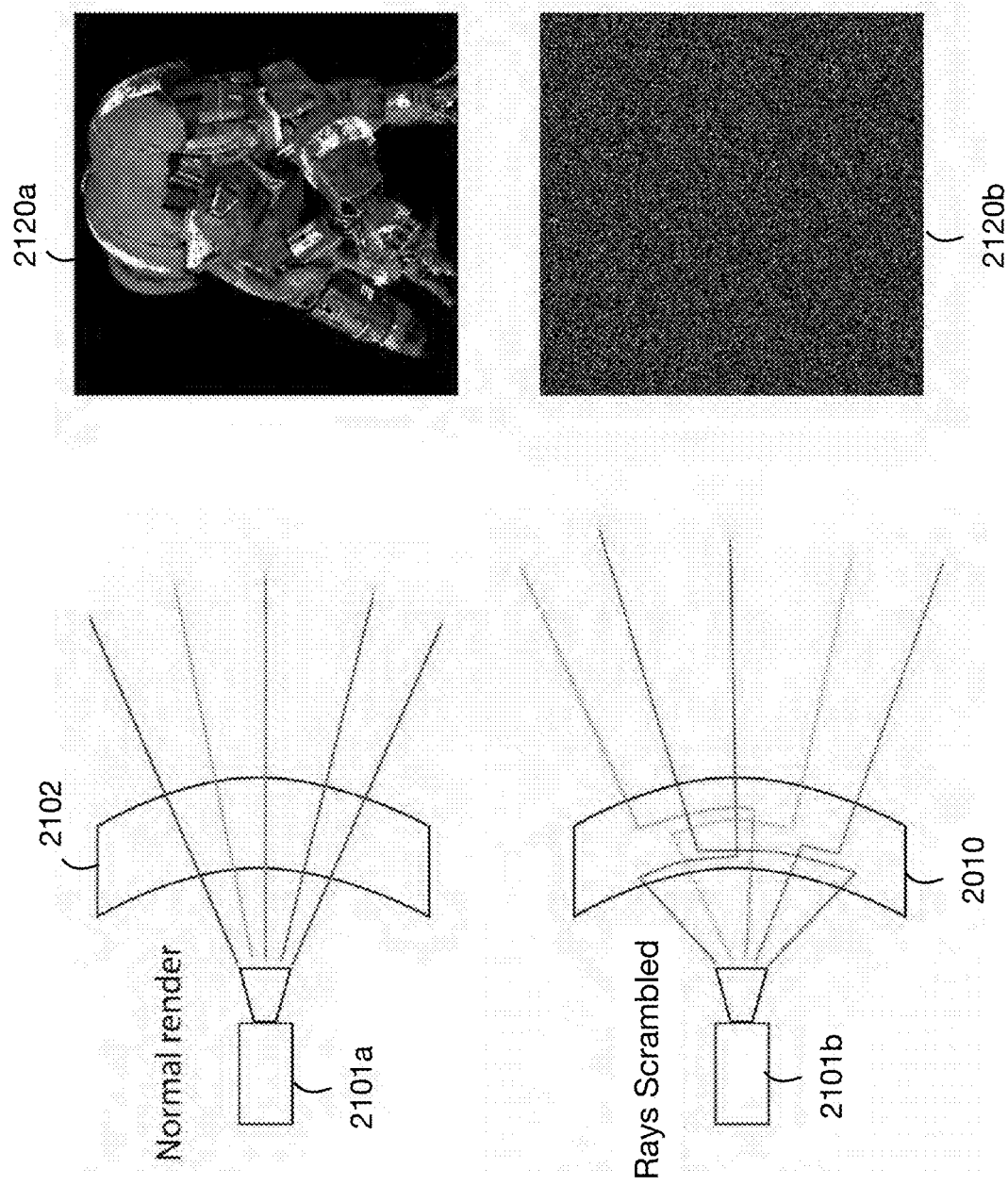
FIG. 21B shows an embodiment of the secure rendering system that scrambles rays so that the output of the system is unviewable prior to recovery of the original ray directions.

FIGS. 21A and 21B illustrate the difference between a normal rendering process with ray tracing (for example as exists in the prior art), and the secure rendering process with ray scrambling as described with respect to FIGS. 19 and 20. FIG. 21A shows a normal rendering process that emits rays from a virtual camera position 2101a in scene. Each ray obtains a color based on its intersections with objects in the model. Rays may be conceptually passed through processing steps that modify ray directions, for example through a lens shader 2102. The resulting image 2120a from the ray tracing depicts the image of the model in the virtual camera 2101a. In contrast, FIG. 21B shows a secure rendering system that emits rays from a virtual camera 2101b and scrambles the ray directions to obtain a securely rendered image 2120b. Although image 2120b contains the same data as image 2120a, it is not interpretable except by a secure render consumer that can unscramble the ray positions to recover the correct image. In one or more embodiments, the ray scrambler 2010 may for example be incorporated into a lens shader, but instead of simply bending rays to reproduce lens effects, the novel scrambler enabled by embodiments of the invention completely changes ray directions as a security measure.

Figure 22:
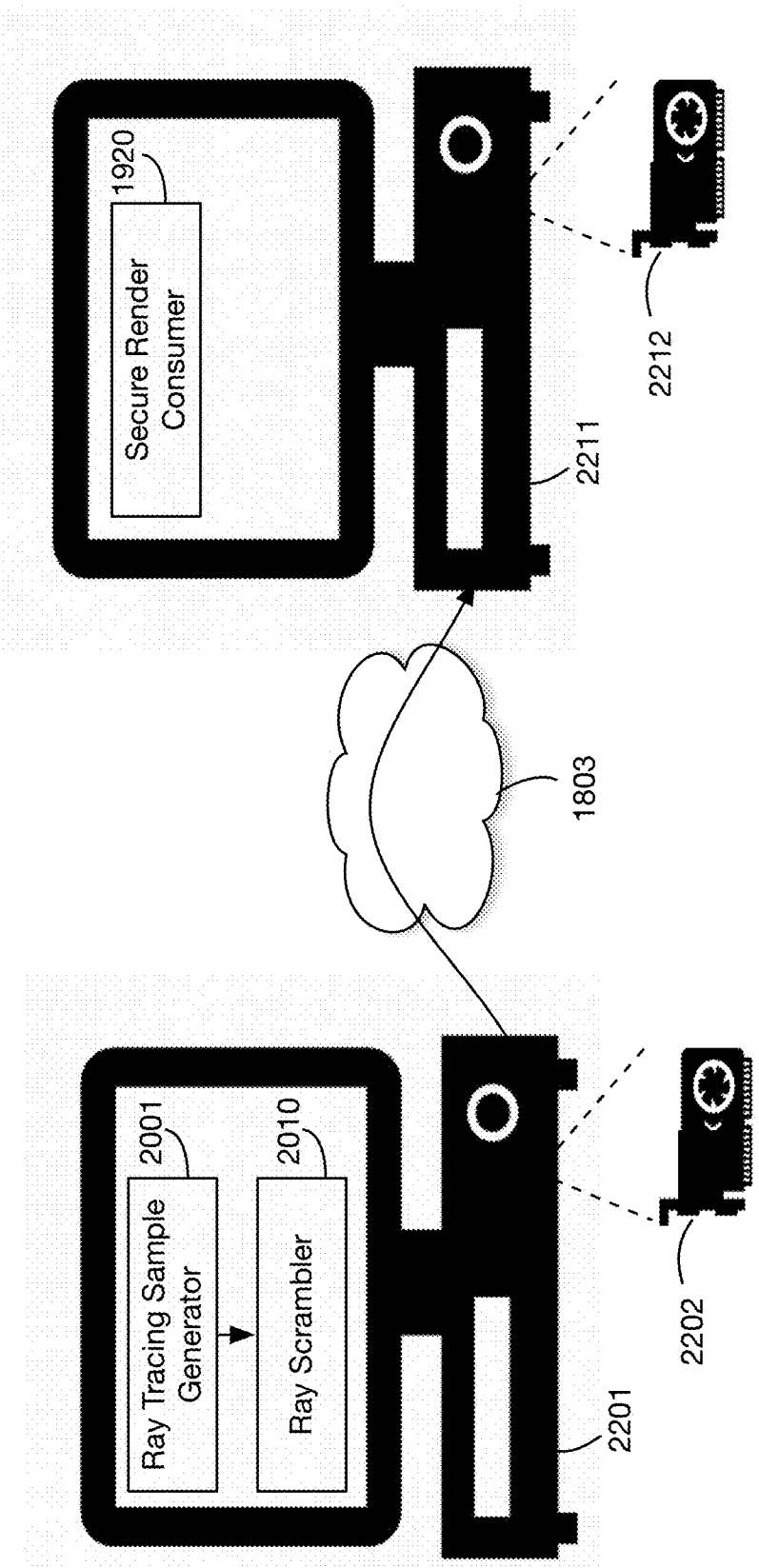
FIG. 22 shows illustrative hardware and components that may be used in or incorporated into one or more embodiments of a secure rendering system.

In one or more embodiments, any or all of the components of a secure rendering system may execute on or be incorporated into one or more processors, such as for example graphics processing units. FIG. 22 shows an illustrative embodiment in which ray tracing sample generator 2001 and ray scrambler 2010 execute on a computer 2201 (which may be a single computer or for example an entire network of servers). Computer or computers 2201 may include one or more graphics processing units 2202, which may execute all or portions of the processing steps associated with the ray tracing sample generator 2001 or the ray scrambler 2010. The secure render resulting from these steps may be for example transmitted over a network 1803 to a different computer or computers 2211, which may execute secure render consumer 1920. The receiving computer or computers 2211 may also in one or more embodiments incorporate or access one or more graphics processing units 2212, which may execute all or a portion of the processing steps of secure render consumer 1920.

Figure 23:
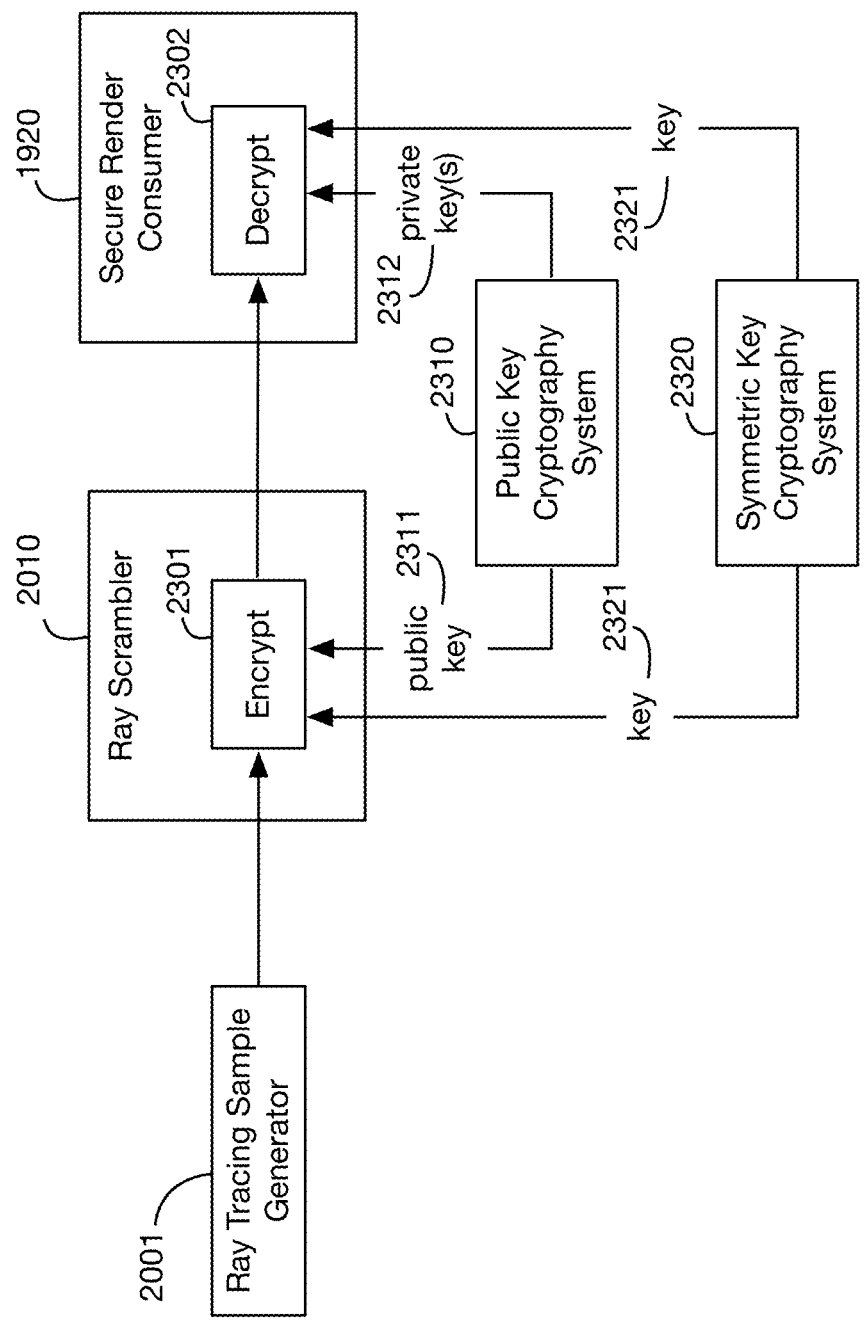
FIG. 23 shows an embodiment of a secure rendering system that uses a cryptographic algorithm, either a public key or private key algorithm, to encrypt ray directions for a secure render.

One or more embodiments may use any desired method or algorithms to scramble and unscramble ray directions or associated position data. FIG. 23 shows an illustrative embodiment that uses cryptographic algorithms to perform the scrambling and unscrambling. For example, ray scrambler 2010 may use an encryption algorithm or subsystem 2301 to scramble the rays generated by ray tracing sample generator 2001, thereby generating a secure render. Secure render consumer 1920 may use a matching decryption algorithm or subsystem 2302 to unscramble the rays or position data within the secure render. One or more embodiments may use a public key cryptography system 2310, which may for example generate a public key 2311 used for encryption, and one or more private keys 2312 used for decryption. One or more embodiments may use a symmetric (private) key cryptography system 2320 with a shared secret key 2321 that may be used for both encryption and decryption.

A potential benefit of using a public key cryptography system with asymmetric keys is that the secure rendering system itself is unable to decrypt the scrambled directions or positions, making the system inherently secure against piracy. Therefore, a studio for example may provide a public key to a secure rendering service, and the secure rendering service may encrypt a secure render that only the key provider can decrypt. The secure rendering service itself effectively has no idea what it is rendering, making piracy impossible or highly impractical. Use of asymmetric keys also simplifies use of a secure rendering service, since secure exchange of a shared hidden key is unnecessary. For example, a user of a secure rendering service can simply provide a public key over a public channel (such as pasting into a web site form), knowing that only the user can decrypt and view the resulting secure renders.

In one or more embodiments, two or more private keys may correspond to a public key. These multiple private keys may be used for example either individually or in combination to decrypt an encrypted secure render. This technology may be known in the art as "multisignature", and it may be used in various configurations to support any desired type of workflow for use of secure render outputs. For example, in one or more embodiments there may be 50 private keys, and it may be required to provide any 3 or more of these keys to unlock a secure render. In one or more embodiments for example a supervisor and an artist may both need to provide their private keys to unlock a secure render; therefore, no artist can begin the unlocking process alone, and no supervisor can start the process without having selected an artist. In one or more embodiments there may be multiple private keys, each belonging for example to a different artist, and each key may be used individually to decrypt a secure render.

Figure 24:
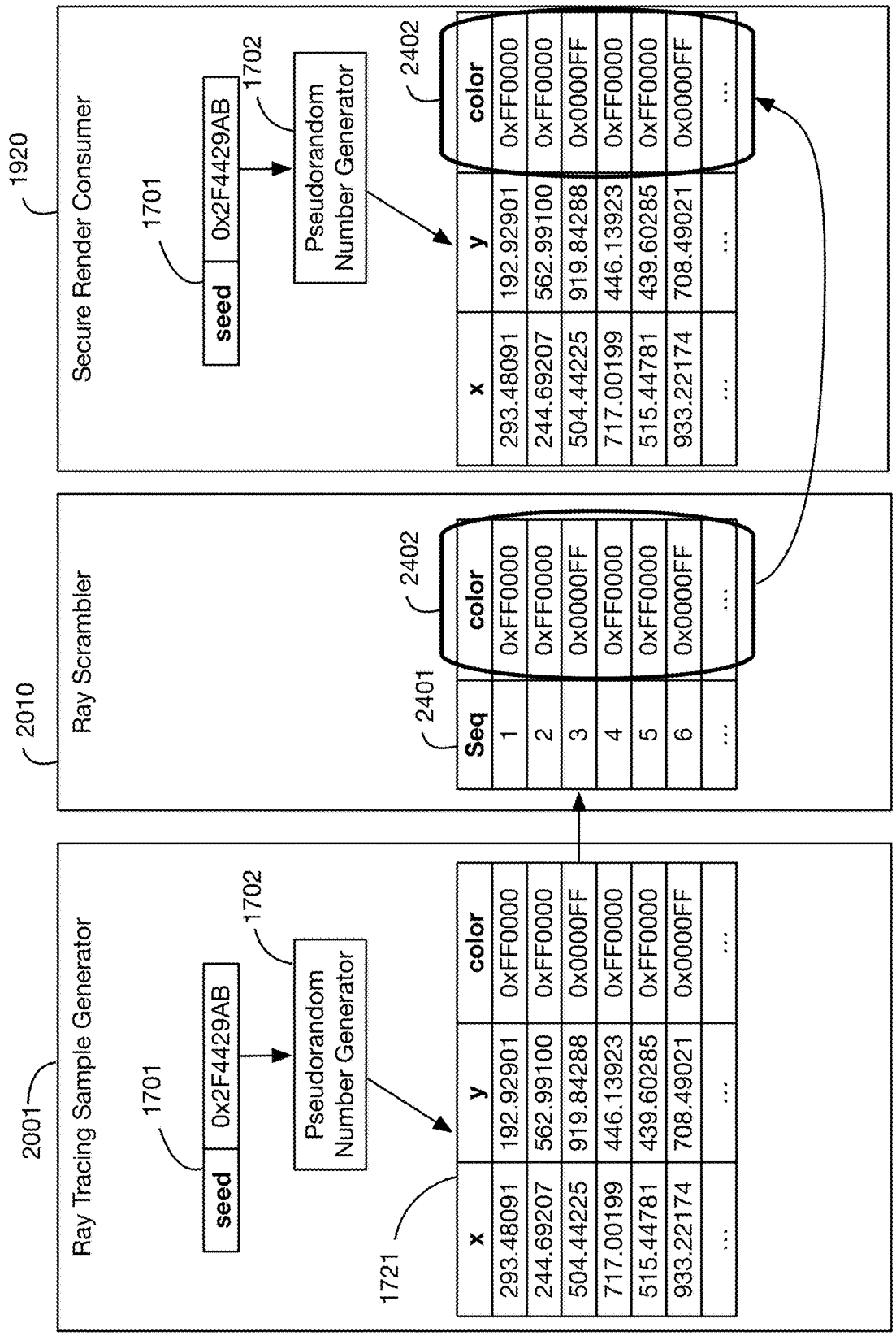
FIG. 24 shows an embodiment of a secure rendering system that uses a seed and a pseudorandom number generator to generate ray directions, and that uses the same seed and pseudorandom number generator to recover ray directions from a secure render that removes the position data.

In one or more embodiments, obfuscation of ray directions may be accomplished using a pseudorandom number generator and seed that are shared between a ray tracing sample generator and a secure render consumer, as described for example with respect to FIG. 17. FIG. 24 illustrates this process using the data shown in FIG. 17. Ray tracing sample generator 2001 generates ray directions using pseudorandom number generator 1702 and seed 1701. This results in ray tracing samples 1721, each of which has a ray direction and a sample color. Ray scrambler 2010 removes the ray directions from the data, leaving only a sequence number 2401 that indicates the order in which the rays were generated by the pseudorandom number generator 1702. Sequence number 2401 may for example be implicit in the ordering of the data in the ray scrambler sample output. Secure render consumer 1920 shares the same seed 1701 and pseudorandom number generator 1702. It copies the color data 2402 and reproduces the ray directions using the pseudorandom number generator.

Figure 25:
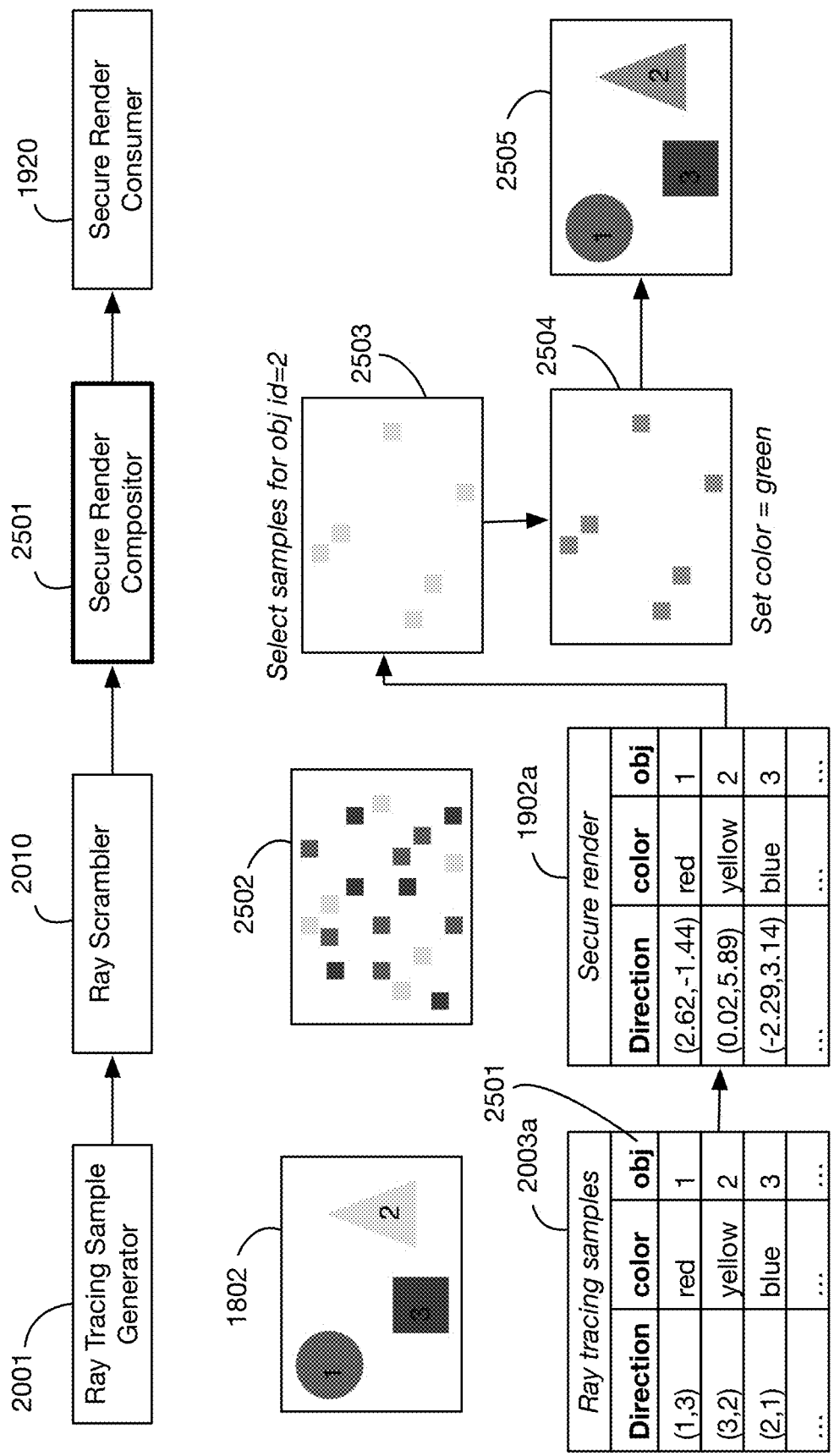
FIG. 25 shows an embodiment of the secure rendering system that applies certain compositing operations directly on the secure render, prior to recovery of the position or ray direction data.

In one or more embodiments, certain compositing operations may be supported and enabled on the secure render data, even prior to unscrambling the scrambled ray directions. For example, a global change to colors in an image such as substituting one color for another or reducing intensity of selected colors may be performed on a secure render without knowing the original ray directions. In one or more embodiments, secure render samples may include for example object identifiers associated with each sample; in these situations, certain compositing operations may be performed on objects prior to unscrambling the ray directions. FIG. 25 shows an example wherein model 1802 includes an identifier for each object, and the ray tracing samples 2003a include an object identifier 2501 in each sample. Secure render 1902a also includes the object identifier in the scrambled samples. The position of the samples in secure render image 2502 is unrecognizable, but the object identifiers associate each sample with the correct original object. A secure render compositor 2501 may for example process the secure render to select certain objects and perform color operations on these objects, prior to unscrambling of ray positions by the secure render consumer 1920. For example, step 2503 selects a specific object (here the yellow triangle object with identifier 2), and modifies the color of this object to green in step 2504. These steps may be performed on the secure render itself, since they do not require the unscrambled ray directions. After unscrambling ray directions in step 1920, the resulting image 2505 shows the color change performed by the compositor 2501.

Figure 26:
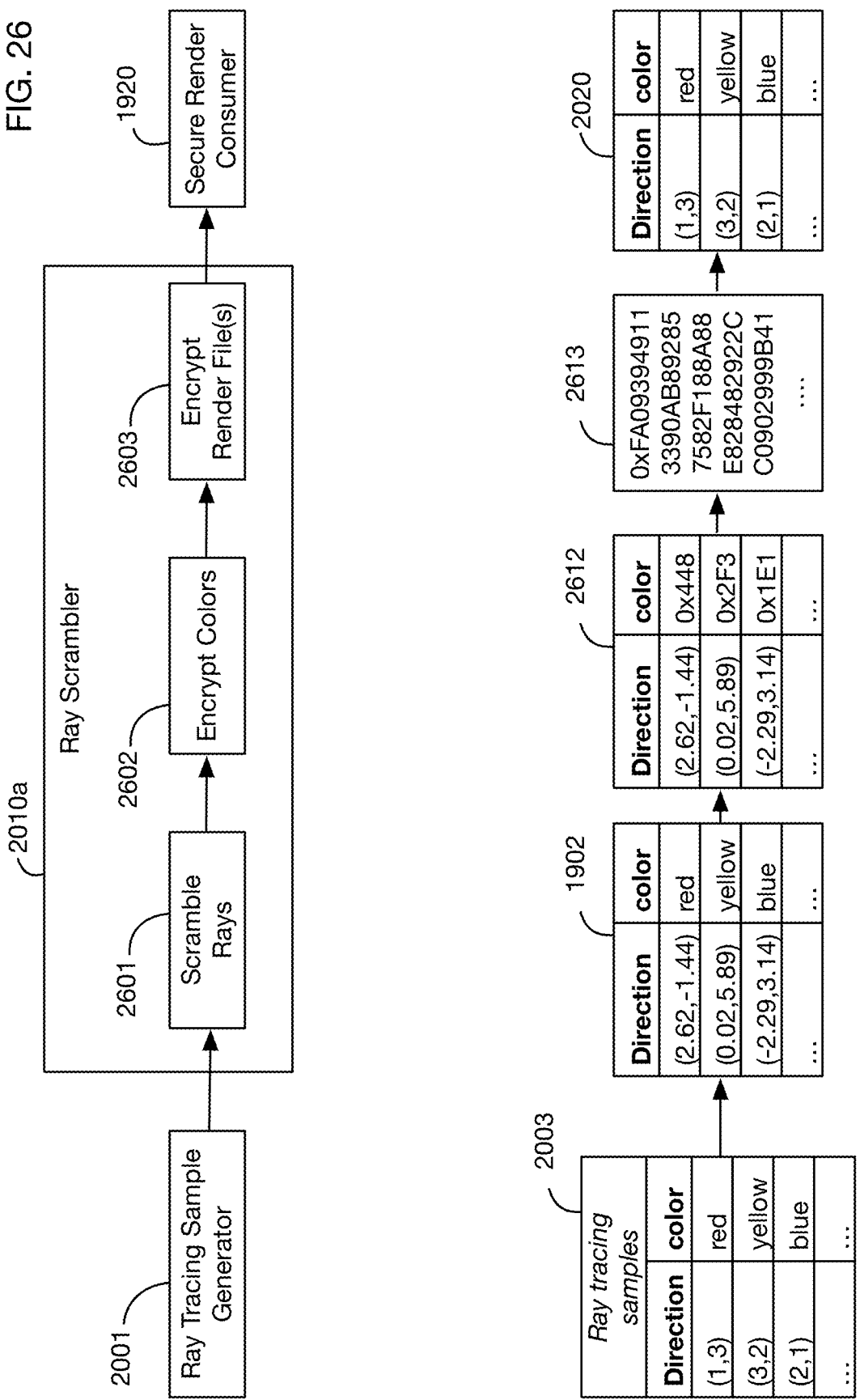
FIG. 26 shows an embodiment of the secure rendering system that incorporates additional security measures of encrypting colors and of encrypting the entire render file or files.

In one or more embodiments, one or more additional security transformations may be applied to a secure render to further obfuscate data. For example, FIG. 26 illustrates an embodiment in which ray scrambler 2010a performs three security transformations on the ray tracing samples 2003. First ray directions are scrambled in step 2601, resulting in output 1902. Then the colors of the samples are encrypted in step 2602, resulting in output 2612. Finally, the entire set of samples with obfuscated positions and colors is further encrypted in step 2603, resulting in output 2613. The secure render consumer 1920 reverses these three transformations to recover the correct render data 2020. These specific transformations are illustrative; one or more embodiments may perform any set of transformations on the ray tracing samples to hide or obfuscate any portion or portions of the data. Compositing operations such as the one described with respect to FIG. 25 may need to apply only certain decrypting transformations to perform the desired composition; for example, the transformations 2503 and 2504 of FIG. 25 if applied to the output 2613 of FIG. 26 would have to reverse encryption steps 2603 and 2602 to change an object's color, but the ray scrambling step 2601 could be performed later after this compositing process.

Figure 27:
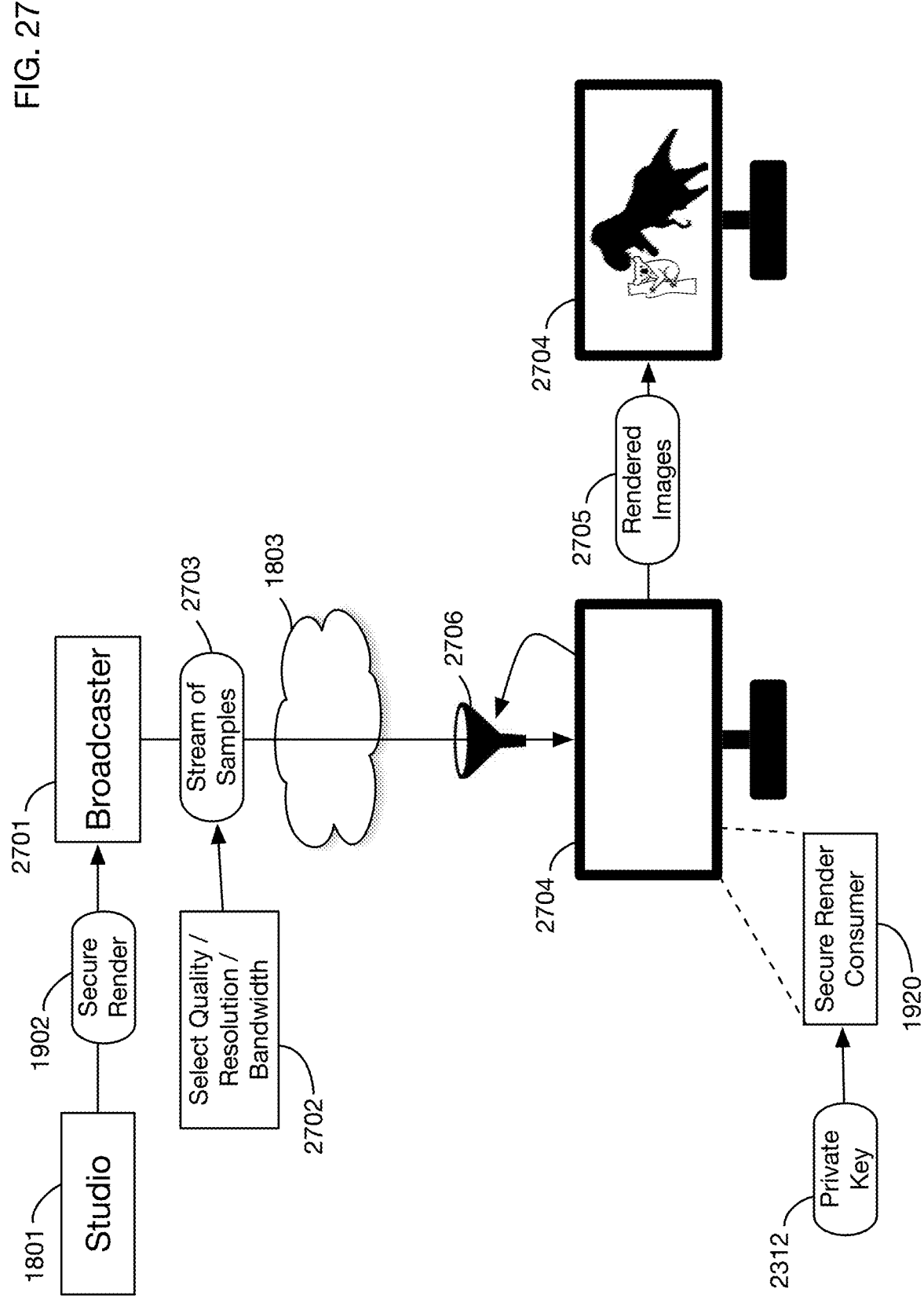
FIG. 27 shows an embodiment of the secure rendering system that incorporates streaming of secure samples as a broadcasting solution, with a secure rendering consumer integrated into a consumer device such as a television.

One or more embodiments may enable a streaming system that dynamically streams ray tracing samples, either secured or unsecured, to a device for display. Current streaming solutions, such as Netflix™ for example, stream pixels of previously rendered images from a server to a consumer. There are many potential benefits to streaming ray tracing samples instead of pixels, and then generating the pixels of an image upon receipt of the samples (for example, within the hardware of a television). Benefits may include for example improved security and simplified adaptation for different display resolutions or network conditions. FIG. 27 shows an illustrative embodiment that incorporates dynamic streaming of samples. A studio 1801 generates or obtains a secure render 1902, which contains ray tracing samples. These samples are provided to broadcaster 2701 for streaming to consumers, for example over Internet connection 1803. In some situations, the studio and the broadcaster may be the same entity; for example, a studio may create content and then stream it directly to consumers as ray tracing samples. For a specific consumer or a group of consumers, the broadcaster outputs stream 2703 of ray tracing samples. The stream may be modified or configured based on factors 2702, which may include for example, without limitation, the desired quality of the stream, the resolution available to consumers, and the available bandwidth of network 1803. In one or more embodiments the stream may be further filtered by a receiver using filter 2706; for example, a receiver with a low-resolution display may select only a subset of samples from the stream 2703. Samples may be streamed for example to device 2704, which may be for example a television, a monitor, a phone, a tablet, a billboard, a kiosk, a smart watch, virtual reality goggles, or any other device or devices that may display, store, forward, or interpret the stream. In one or more embodiments, the stream of samples 2703 may be secure; for example, it may contain ray tracing samples with encrypted position data. The device 2704 may therefore decrypt the stream and then convert the samples to displayable images. For example, the device 2704 may have an embedded secure render consumer 1920, which contains or accesses a private key 2312 that may be used to decrypt the secure stream of samples. This embedded sample consumer may for example execute on an ASIC or a GPU included in or accessible to the device hardware. Device 2704 may generate rendered images 2705 from the sample stream 2703 (or from some subset of the samples selected by the device via filter 2706) and display these images on the device.

Embodiments that stream samples to devices can adjust or filter the stream for different devices or different network conditions, without needing to store different formats for different situations. Stream quality may also be dynamically adjusted based on the quality of the network connection, potentially for each frame. The receiving devices can also determine what they are capable of displaying, and select from the sample stream accordingly, rather than having the broadcaster guess what format is optimal for each receiver.

FIG. 28 illustrates modification or filtering of a stream of samples based on resolution or bandwidth. The sample stream is configured based on factors 2702 (or filtered after transmission based on these factors). Three illustrative scenarios are shown. In scenario 2801a, the receiver can display 4K HDR (high dynamic range) images, so the entire set of samples 2802a is transmitted to device 2704a. In scenario 2801b, the receiver can display high definition images (but not 4K HDR), so only one quarter of the samples 2802b are transmitted to device 2704b. In scenario 2801c, there is a poor network connection, so only one eighth of the samples 2802c are transmitted over the network to device 2704c. These scenarios are illustrative; one or more embodiments may modify, or filter sample streams based on any factor or factors.

While the invention herein disclosed has been described by means of specific embodiments and applications thereof, numerous modifications and variations could be made thereto by those skilled in the art without departing from the scope of the invention set forth in the claims.

What is claimed is:

1. A video security and ray tracing samples compression system, comprising:
   a memory;
   a processor coupled with said memory, wherein said processor is configured to
     obtain a plurality of ray tracing samples from a ray tracing renderer, each ray tracing sample of said plurality of ray tracing samples comprising
       a sample location corresponding to an intersection of a ray with a three-dimensional model of a scene, wherein said sample location comprises one or more floating point coordinates; and,
       a sample color corresponding to said intersection;
     wherein
       said plurality of ray tracing samples is not aligned on a regular grid; and, said plurality of ray tracing samples is represented by a first data structure in said memory, said first data structure comprising a first size;

transform said first data structure into a second data structure in said memory, wherein said second data structure comprises a second size that is smaller than said first size;

said second data structure comprises a compressed representation of said one or more floating point coordinates associated with said sample location associated with each ray tracing sample of said plurality of ray tracing samples; and a representation of said sample color associated with each ray tracing sample of said plurality of ray tracing samples;

said transform said first data structure into said second data structure is not based on an image in rasterized format of said three-dimensional model of a scene that comprises one or more pixels; and said second data structure does not comprise said image in rasterized format of said three-dimensional model of a scene comprising said one or more pixels; and, output said second data structure to a receiving device; and, said ray tracing renderer;

wherein said sample location associated with each ray tracing sample comprises a scrambled ray direction;

said ray tracing renderer is configured to transform an original ray direction associated with each ray tracing sample of said plurality of ray tracing samples into said scrambled ray direction; and, said second data structure transmitted to said receiving device does not comprise said original ray direction and does not comprise a sample location corresponding to said original ray direction.

2. The system of claim 1 wherein said receiving device comprises a storage device.

3. The system of claim 1 wherein said receiving device comprises a display and is configured to recreate said first data structure from said second data structure;

generate said image in rasterized format comprising said one or more pixels from said first data structure; and, display said image on said display.

4. The system of claim 1, wherein said memory comprises a rectangular region containing sample locations associated with said plurality of ray tracing samples;

said rectangular region is partitioned into one or more tiles, wherein each tile of said one or more tiles corresponds to a portion of said rectangular region;

any two tiles of said one or more tiles do not overlap; and each point of said rectangular region is contained in exactly one tile of said one or more tiles; and, said second data structure comprises tile information associated with each tile of said one or more tiles, wherein said tile information associated with said tile of said one or more tiles comprises said compressed representation of said one or more floating point coordinates of each sample location within said tile.

5. The system of claim 4 wherein a number of sample locations within said each tile is not uniform across said one or more tiles; and, a position of said sample locations within said each tile is not uniform across said one or more tiles.

6. The system of claim 5 wherein each tile of said one or more tiles corresponds to said one or more pixels of said image.

7. The system of claim 5 wherein said second data structure further comprises a table comprising one or more entries, each entry corresponding to a tile of said one or more tiles; and, a reference in each entry of said one or more entries to said tile information corresponding to said tile corresponding to said entry.

8. The system of claim 5 wherein said compressed representation of said one or more floating point coordinates of each sample location within said tile comprises offset information between said each sample location and an origin location in said tile.

9. The system of claim 8 wherein said origin location in said tile is a corner of said tile.

10. The system of claim 8 wherein said origin location in said tile is a center of said tile.

11. The system of claim 8 wherein a range of said offset information is smaller than a range of sample locations in said first data structure; and, said offset information is represented with fewer bits in said second data structure than a corresponding number of bits that represents said one or more floating point coordinates in said first data structure.

12. The system of claim 8 wherein said offset information comprises one or more floating point numbers with truncated precision.

13. The system of claim 5 wherein each tile of said one or more tiles is partitioned into a plurality of subregions;

said tile information associated with each said tile of said one or more tiles comprises a bitmask with a bit corresponding to each subregion of said plurality of subregions within said tile;

said bit in said bitmask represents whether one or more sample locations are within said subregion corresponding to said bit; and, said compressed representation of said one or more floating point coordinates of each sample location within said tile comprises said bit in said bitmask corresponding to a subregion containing said sample location.

14. The system of claim 13 wherein when two or more sample locations are within a subregion, said second data structure further comprises combined color information for ray tracing samples corresponding to said two or more sample locations.

15. The system of claim 5 wherein said tile information for each tile of said one or more tiles comprises a seed value that generates said sample location associated with each ray tracing sample of said plurality of ray tracing samples comprising said sample location within said each tile; and, said compressed representation of said one or more floating point coordinates of each sample location within said tile comprises an order in which said sample location is generated within said tile.

16. The system of claim 15 wherein
said receiving device comprises a display; and,
said receiving device is configured to
- recreate said first data structure from said second data structure, wherein said recreate said first data structure comprises
  - generate said sample location from said seed value associated with each tile of said one or more tiles;
  - generate said image in rasterized format comprising said one or more pixels from said first data structure; and,
- display said image on said display.

17. The system of claim 16, further comprising said receiving device.

18. The system of claim 1, wherein
said receiving device further comprises a display; and
said receiving device is configured to
- recreate said first data structure from said second data structure;
- transform said plurality of ray tracing samples in said first data structure into a corresponding plurality of unscrambled ray tracing samples, wherein each unscrambled ray tracing sample of said plurality of unscrambled ray tracing samples comprises
  - said sample color; and
  - said sample location corresponding to said original ray direction;
- generate said image in rasterized format comprising said one or more pixels from said plurality of unscrambled ray tracing samples; and,
- display said image on said display.

19. The system of claim 18 further comprising said receiving device.

20. The system of claim 18 wherein
said ray tracing renderer is further configured to calculate said scrambled ray direction through encryption of said original ray direction with a cryptography algorithm and through use of an encryption key; and,
said receiving device computes said sample location corresponding to said original ray direction through decryption of said scrambled ray direction with said cryptography algorithm through use of a decryption key that matches said encryption key.

21. The system of claim 20 wherein
said cryptography algorithm comprises a public key cryptography algorithm;
said encryption key comprises a public key of said public key cryptography algorithm; and,
said decryption key comprises a private key of said public key cryptography algorithm corresponding to said public key
or
said decryption key comprises a plurality of private keys and wherein
said cryptography algorithm decrypts said scrambled ray direction using any one of said plurality of private keys or using a combination of two or more of said plurality of private keys.

22. The system of claim 20 wherein said cryptography algorithm comprises a symmetric key cryptography algorithm; and, said encryption key and said decryption key are identical keys.

23. The system of claim 18 wherein
said ray tracing renderer generates said original ray direction of each ray tracing sample of said plurality of ray tracing samples using a pseudorandom number generator and a seed;
said scrambled ray direction comprises an order in which said pseudorandom number generator generated said original ray direction;
said receiving device further comprises said pseudorandom number generator and said seed; and,
said receiving device uses said pseudorandom number generator, said seed, and said order to generate said original ray direction of each of ray tracing sample.

24. The system of claim 1 wherein said processor is further configured to apply one or more compositing operations to modify said plurality of ray tracing samples to form composited ray tracing samples.

25. The method of claim 24, wherein said processor is further configured to generate a preview image from said composited ray tracing samples.

* * * * *